US012595655B2

(12) United States Patent
Bartnik Johansson et al.

(10) Patent No.: US 12,595,655 B2
(45) Date of Patent: Apr. 7, 2026

(54) INSULATION PRODUCTS

(71) Applicant: ROCKWOOL A/S, Hedehusene (DK)

(72) Inventors: Dorte Bartnik Johansson, Hedehusene (DK); Miroslav Nikolic, Hedehusene (DK)

(73) Assignee: Rockwool A/S, Hedehusene (DK)

(*) Notice: Subject to any disclaimer, the term of this patent is extended or adjusted under 35 U.S.C. 154(b) by 244 days.

(21) Appl. No.: 18/259,353

(22) PCT Filed: Oct. 1, 2021

(86) PCT No.: PCT/EP2021/077185
§ 371 (c)(1),
(2) Date: Jun. 26, 2023

(87) PCT Pub. No.: WO2022/144107
PCT Pub. Date: Jul. 7, 2022

(65) Prior Publication Data

US 2024/0399716 A1 Dec. 5, 2024

(51) Int. Cl.
*E04B 1/86* (2006.01)
*B01J 20/24* (2006.01)
(Continued)

(52) U.S. Cl.
CPC ................. *E04B 1/86* (2013.01); *B01J 20/24* (2013.01); *B01J 20/28004* (2013.01);
(Continued)

(58) Field of Classification Search
CPC ............... C08L 97/005; C08L 2205/06; C08L 2312/00; E04B 1/86; E04B 1/88;
(Continued)

(56) References Cited

U.S. PATENT DOCUMENTS 3,093,604 A 6/1963 Ayers
3,285,801 A 11/1966 Sargent
(Continued)

FOREIGN PATENT DOCUMENTS

CA 2277286 7/1998
CN 2351274 12/1999
(Continued)

OTHER PUBLICATIONS

International Search Report/Written Opinion, PCT/EP2020/059653, mail date Dec. 9, 2020, PCT/ISA/210, PCT/ISA/220, PCT/ISA/237.
(Continued)

*Primary Examiner* — Camie S Thompson
(74) *Attorney, Agent, or Firm* — SALIWANCHIK, LLOYD & EISENSCHENK

(57) ABSTRACT

The invention relates to a method of making an insulation product and a novel insulation product, wherein the insulation product is made by adhering a facing to at least one major surface of a batt of man-made vitreous fibres in a matrix comprising a binder by the use of an adhesive and curing the adhesive. The adhesive is an aqueous composition which is free of phenol and formaldehyde and comprises:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers.

50 Claims, 3 Drawing Sheets

(51) Int. Cl.

| | |
|---|---|
| ***B01J 20/28*** | (2006.01) |
| ***B01J 20/30*** | (2006.01) |
| ***B32B 3/18*** | (2006.01) |
| ***B32B 5/02*** | (2006.01) |
| ***B32B 5/10*** | (2006.01) |
| ***B32B 5/26*** | (2006.01) |
| ***B32B 17/02*** | (2006.01) |
| ***B32B 37/12*** | (2006.01) |
| ***C04B 14/46*** | (2006.01) |
| ***C04B 20/00*** | (2006.01) |
| ***C04B 24/32*** | (2006.01) |
| ***C04B 26/02*** | (2006.01) |
| ***C08J 5/04*** | (2006.01) |
| ***C08K 13/02*** | (2006.01) |
| ***C08L 97/00*** | (2006.01) |
| ***D04H 1/4209*** | (2012.01) |
| ***D04H 1/4218*** | (2012.01) |
| ***D04H 1/587*** | (2012.01) |
| ***D04H 1/60*** | (2006.01) |
| ***D04H 1/72*** | (2012.01) |
| ***E01C 13/08*** | (2006.01) |
| ***E04B 1/88*** | (2006.01) |
| ***E04D 11/02*** | (2006.01) |
| ***E04D 13/04*** | (2006.01) |
| *C04B 103/30* | (2006.01) |
| *C04B 111/52* | (2006.01) |
| *C08K 3/22* | (2006.01) |
| *C08K 5/053* | (2006.01) |
| *C08K 5/07* | (2006.01) |
| *C08K 5/1515* | (2006.01) |
| *C08K 5/1545* | (2006.01) |
| *C08K 5/17* | (2006.01) |
| *C08K 5/20* | (2006.01) |
| *C08K 5/21* | (2006.01) |
| *E04B 1/74* | (2006.01) |
| *E04B 1/84* | (2006.01) |
| *E04D 11/00* | (2006.01) |

(52) U.S. Cl.

CPC ..... *B01J 20/28023* (2013.01); *B01J 20/2803* (2013.01); *B01J 20/3042* (2013.01); *B32B 3/18* (2013.01); *B32B 5/02* (2013.01); *B32B 5/10* (2013.01); *B32B 5/26* (2013.01); *B32B 17/02* (2013.01); *B32B 37/1207* (2013.01); *C04B 14/46* (2013.01); *C04B 20/0048* (2013.01); *C04B 24/32* (2013.01); *C04B 26/02* (2013.01); *C08J 5/0405* (2021.05); *C08K 13/02* (2013.01); *C08L 97/005* (2013.01); *D04H 1/4209* (2013.01); *D04H 1/4218* (2013.01); *D04H 1/587* (2013.01); *D04H 1/60* (2013.01); *D04H 1/72* (2013.01); *E01C 13/08* (2013.01); *E04B 1/88* (2013.01); *E04D 11/02* (2013.01); *E04D 13/0404* (2013.01); *B01J 2220/4837* (2013.01); *B32B 2037/1253* (2013.01); *B32B 2250/02* (2013.01); *B32B 2260/023* (2013.01); *B32B 2260/046* (2013.01); *B32B 2262/101* (2013.01); *B32B 2262/16* (2021.05); *B32B 2307/304* (2013.01); *B32B 2307/72* (2013.01); *B32B 2307/7265* (2013.01); *B32B 2307/7376* (2023.05); *B32B 2419/06* (2013.01); *C04B 2103/30* (2013.01); *C04B 2111/52* (2013.01); *C04B 2201/30* (2013.01); *C08K 3/22* (2013.01); *C08K 5/053* (2013.01); *C08K 5/07* (2013.01); *C08K 5/1515* (2013.01); *C08K 5/1545* (2013.01); *C08K 5/17* (2013.01); *C08K 5/20* (2013.01); *C08K 5/21* (2013.01); *C08K 2201/014* (2013.01); *C08L 2205/06* (2013.01); *C08L 2312/00* (2013.01); *D10B 2401/063* (2013.01); *D10B 2505/18* (2013.01); *E01C 2201/10* (2013.01); *E01C 2201/16* (2013.01); *E01C 2201/20* (2013.01); *E04B 2001/742* (2013.01); *E04B 2001/8461* (2013.01); *E04D 11/002* (2013.01)

(58) Field of Classification Search

CPC ....... E04B 2001/742; E04B 2001/8461; Y02A 30/254; B32B 2262/16; B32B 2307/7376; B32B 3/18; B32B 5/02; B32B 5/10; B32B 5/26; B32B 37/1207; B32B 2037/1253; B32B 17/02; B32B 2250/02; B32B 2260/023; B32B 2260/046; B32B 2262/101; B32B 2307/304; B32B 2307/72; B32B 2307/7265; B32B 2419/06; C08J 5/0405; B01J 20/24; B01J 20/28004; B01J 20/2803; B01J 20/3042; B01J 2220/4837; C04B 14/46; C04B 20/0048; C04B 24/32; C04B 26/02; C04B 2103/30; C04B 2111/52; C04B 2201/30; C08K 3/22; C08K 13/02; C08K 2201/14; D04H 1/4209; D04H 1/4218; D04H 1/587; D04H 1/60; D04H 1/72; D10B 2401/063; D10B 2505/18; E04D 11/02; E04D 11/002; E04D 13/0404; Y02B 80/32

See application file for complete search history.

(56) References Cited

U.S. PATENT DOCUMENTS

| | | | |
|---|---|---|---|
| 3,923,532 | A | 12/1975 | Morman |
| 5,318,990 | A | 6/1994 | Strauss |
| 5,382,608 | A | 1/1995 | Gardzielia |
| 5,817,387 | A | 10/1998 | Allwein et al. |
| 6,238,475 | B1 | 5/2001 | Gargulak et al. |
| 6,706,853 | B1 | 3/2004 | Stanssens et al. |
| 6,818,699 | B2 | 11/2004 | Kajimaru et al. |
| 8,623,234 | B2 | 1/2014 | Jaffrennou |
| 10,435,329 | B2 | 10/2019 | Allais et al. |
| 2003/0042344 | A1 | 3/2003 | Fisch et al. |
| 2004/0034154 | A1 | 2/2004 | Tutin et al. |
| 2006/0150494 | A1 | 7/2006 | Masson |
| 2007/0173588 | A1 | 7/2007 | Espiard et al. |
| 2010/0069662 | A1 | 3/2010 | Udo et al. |
| 2011/0159768 | A1 | 6/2011 | Crescimanno et al. |
| 2013/0283688 | A1 | 10/2013 | Naerum et al. |
| 2014/0039146 | A1 | 2/2014 | Abidal |
| 2014/0094562 | A1 | 4/2014 | Hagiopol et al. |
| 2017/0198142 | A1 | 7/2017 | Hampson et al. |
| 2018/0002225 | A1 | 1/2018 | Allais et al. |
| 2018/0009708 | A1 | 1/2018 | Allais |
| 2018/0201542 | A1 | 7/2018 | Hansen |
| 2019/0338168 | A1 | 11/2019 | Laine et al. |

FOREIGN PATENT DOCUMENTS

| | | | |
|---|---|---|---|
| CN | 1944014 | A | 4/2007 |
| CN | 107286873 | | 10/2017 |
| DE | 42 26 329 | | 5/1993 |
| DE | 10 2004 047193 | | 9/2005 |
| EP | 0148050 | | 7/1985 |
| EP | 0367194 | | 10/1989 |
| EP | 0583086 | | 2/1994 |
| EP | 0990727 | | 4/2000 |
| EP | 0996653 | | 5/2000 |
| EP | 1578879 | | 1/2007 |
| EP | 1741726 | | 1/2007 |
| EP | 1770123 | A1 | 4/2007 |

(56) References Cited

FOREIGN PATENT DOCUMENTS

| | | |
|---|---|---|
| EP | 1889859 | 2/2008 |
| EP | 1897433 | 3/2008 |
| EP | 1457107 | 5/2012 |
| EP | 3299421 | 3/2018 |
| EP | 3348725 | 7/2018 |
| EP | 2721102 | 9/2018 |
| EP | 3632866 | 4/2020 |
| EP | 3250534 | 12/2020 |
| FR | 2976583 | 12/2012 |
| FR | 2976584 | 12/2012 |
| FR | 2976585 | 12/2012 |
| FR | 3032194 | 8/2016 |
| FR | 3032195 | 8/2016 |
| GB | 2113517 | 8/1983 |
| GB | 2177048 | 1/1987 |
| SE | 1950773 | 12/2020 |
| WO | 87/07520 | 12/1987 |
| WO | 93/04242 | 3/1993 |
| WO | 95/34517 | 12/1995 |
| WO | 98/31763 | 7/1998 |
| WO | 98/31825 | 7/1998 |
| WO | 98/31895 | 7/1998 |
| WO | 99/36368 | 7/1999 |
| WO | 00/57101 | 9/2000 |
| WO | 01/05725 | 1/2001 |
| WO | 01/96460 | 12/2001 |
| WO | 02/06178 | 1/2002 |
| WO | 02/066877 | 8/2002 |
| WO | 2004/007615 | 1/2004 |
| WO | 2004/033194 | 4/2004 |
| WO | 2005/095727 | 10/2005 |
| WO | 2006/061249 | 6/2006 |
| WO | 2008/009278 | 1/2008 |
| WO | 2008/009460 | 1/2008 |
| WO | 2008/009461 | 1/2008 |
| WO | 2008/009462 | 1/2008 |
| WO | 2008/009465 | 1/2008 |
| WO | 2008/009467 | 1/2008 |
| WO | 2008/023032 | 2/2008 |
| WO | 2008/073186 | 6/2008 |
| WO | 2008/155401 | 12/2008 |
| WO | 2009/090053 | 7/2009 |
| WO | 2010/003677 | 1/2010 |
| WO | 2010/046074 | 4/2010 |
| WO | 2010/093785 | 8/2010 |
| WO | 2011/042610 | 4/2011 |
| WO | 2011/044490 | 4/2011 |
| WO | 2012/028650 | 3/2012 |
| WO | 2012/076462 | 6/2012 |
| WO | 2012/113058 | 8/2012 |
| WO | 2012/167252 | 12/2012 |
| WO | 2012/172262 | 12/2012 |
| WO | 2013/034376 | 3/2013 |
| WO | 2013/060634 | 5/2013 |
| WO | 2013/072082 | 5/2013 |
| WO | 2013/113410 | 8/2013 |
| WO | 2014/029872 | 2/2014 |
| WO | 2014/029873 | 2/2014 |
| WO | 2015/022550 | 2/2015 |
| WO | 2016/009054 | 1/2016 |
| WO | 2016/120575 | 8/2016 |
| WO | 2016/120576 | 8/2016 |
| WO | 2016/120579 | 8/2016 |
| WO | 2017/074771 | 5/2017 |
| WO | 2017/114723 | 7/2017 |
| WO | 2017/114724 | 7/2017 |
| WO | 2017/194718 | 11/2017 |
| WO | 2017/194722 | 11/2017 |
| WO | 2018/158677 | 9/2018 |
| WO | 2018/193166 | 10/2018 |
| WO | 2018/206132 | 11/2018 |
| WO | 2019/202475 | 10/2019 |
| WO | 2019/202477 | 10/2019 |
| WO | 2020/008311 | 1/2020 |
| WO | 2020/018599 | 1/2020 |
| WO | 2020/058384 | 3/2020 |
| WO | 2020/070337 | 4/2020 |
| WO | 2020/070341 | 4/2020 |
| WO | 2020/104523 | 5/2020 |
| WO | 2020/109983 | 6/2020 |
| WO | 2020/261087 | 12/2020 |
| WO | 2021/124125 | 6/2021 |
| WO | 2021/197626 | 10/2021 |
| WO | 2021/198474 | 10/2021 |

OTHER PUBLICATIONS

Xiangwei Zhu et al., Bio-Based Wood Adhesive from Camelina Protein (a Biosiesel Residue) and Depolymerized Lignin with Improved Water resistance, ACS Omega, Nov. 16, 2017, vol. 2, No. 11, 7996-8004.

International Search Report, International Application No. PCT/EP2019/077133, mail date Dec. 9, 2019, 6 pages.

International Search Report and Written Opinion, International Application No. PCT/EP2020/059645, mail date Feb. 23, 2021, 17 pages.

International Search Report and Written Opinion, International Application No. PCT/EP2020/059649, mail date Oct. 21, 2020, 13 pages.

International Search Report and Written Opinion, International Application No. PCT/EP2020/059619, mail date Dec. 7, 2020, 22 pages.

International Search Report and Written Opinion, International Application No. PCT/EP2020/059671, mail date Jan. 18, 2021, 12 pages.

International Search Report and Written Opinion, International Application No. PCT/EP2020/059636, mail date Dec. 11, 2020, 20 pages.

International Search Report and Written Opinion, International Application No. PCT/EP2020/059670, mail date Jan. 18, 2021, 12 pages.

International Search Report and Written Opinion, International Application No. PCT/EP2020/059666, mail date Jan. 25, 2021, 14 pages.

International Search Report and Written Opinion, International Application No. PCT/EP2020/059651, mail date Jan. 25, 2021, 15 pages.

International Search Report and Written Opinion, International Application No. PCT/EP2020/059650, mail date Dec. 10, 2020, 17 pages.

International Search Report and Written Opinion, International Application No. PCT/EP2020/059660, mail date Jan. 18, 2021, 12 pages.

International Search Report and Written Opinion, International Application No. PCT/EP2020/059655, mail date Jan. 18, 2021, 13 pages.

International Search Report and Written Opinion, International Application No. PCT/EP2020/059617, mail date Dec. 15, 2020, 16 pages.

International Search Report, International Application No. PCT/EP201/076123, mail date Oct. 21, 2019, 4 pages.

International Search Report and Written Opinion, International Application No. PCT/EP2020/059656, mail date Dec. 18, 2020, 16 pages.

International Search Report and Written Opinion, International Application No. PCT/EP2020/059659, mail date Jan. 18, 2021.

Masoumeh Ghorbani et al., Ammoxidized Fenton-Activated Pine Kraft Lignin Accelerates Synthesis and Curing of Resole Resins, Polymers 2017, 9, 43.

Dietrich Meier et al., Conversion of Technical Lignins into Slow-Release Nitrogenous Fertilizers by Ammoxidation in Liquid Phase, Bioresource Technology, 49, 1994, 121-128.

Richard J.A. Gosselink et al., Effect of periodate on lignin for wood adhesive application, International Journal of the Biology, Chemistry, Physics and Technology of Wood, vol. 65, No. 2, Jan. 1, 2011, pp. 155-162.

(56) References Cited

OTHER PUBLICATIONS

Venla Hemmila et al., Lignin: an adhesive raw material of the future or waste of research energy?, Northern European Network for Wood Science and Engineering (WSE), Sep. 11-12, 2013, pp. 98-103.
International Search Report and Written Opinion, International Application No. PCT/EP2021/077189, mail date Jan. 18, 2022.
International Search Report and Written Opinion, International Application No. PCT/EP2021/077185, mail date Jan. 18, 2022.
International Search Report and Written Opinion, International Application No. PCT/EP2021/077186, mail date Jan. 18, 2022.
International Search Report and Written Opinion, International Application No. PCT/EP2021/077191, mail date Jan. 18, 2022.
International Search Report and Written Opinion, International Application No. PCT/EP2021/077194, mail date Jan. 18, 2022.
International Search Report and Written Opinion, International Application No. PCT/2021/077183, mail date Jan. 18, 2022.
International Search Report and Written Opinion, International Application No. PCT/EP2021/077195, mail date Jan. 18, 2022.
International Search Report, International Application No. PCT/EP2021/077193, mail date Nov. 8, 2021.
International Search Report and Written Opinion, International Application No. PCT/EP2021/077135, mail date Jan. 18, 2022.
International Search Report, International Application No. PCT/EP2021/077180, mail date Jan. 18, 2022.
International Search Report and Written Opinion, International Application No. PCT/EP2020/059645, mail date Dec. 14, 2020.
International Search Report and Written Opinion, International Application No. PCT/EP2021/058706, mail date Jun. 17, 2021.

INSULATION PRODUCTS

CROSS-REFERENCE TO RELATED APPLICATIONS

This application is a national stage application of International Patent Application No. PCT/EP2021/077185, filed Oct. 1, 2021, which claims priority to International Patent Application No. PCT/EP2020/088061, filed Dec. 30, 2020, the disclosures of each of which are incorporated herein by reference in their entirety, including any figures, tables, and drawings.

The invention relates to insulation products for uses such as sound, thermal and fire insulation. In particular the invention relates to methods of making such insulation products and systems comprising such insulation products.

It is well known to provide insulation products for sound, heat and fire insulation. A common form for such products is an insulation element in the form of a batt and having a facing adhered to a major surface of the batt.

It is important that the adhesive used to adhere the facing to the batt has appropriate properties. In particular it is important that the adhesion strength (often defined in terms of peel-off strength) is adequate.

It is common to use phenol-formaldehyde resin as an adhesive for the facing. This is particularly useful in the context of insulation elements which are formed of a matrix of man-made vitreous fibres (MMVF) bonded by a binder, because phenol-formaldehyde resins are commonly used as binder for such products already. Phenol-formaldehyde adhesive gives good results and is commonly used in commercial practice.

Phenol-formaldehyde resins can be economically produced and can be extended with urea prior to use as an adhesive. However, the existing and proposed legislation directed to the lowering or elimination of formaldehyde emissions has led to the development of formaldehyde-free adhesives such as, for instance, the adhesive compositions based on polycarboxy polymers and polyols or polyamines, such as disclosed in EP-A-583086, EP-A-990727, EP-A-1741726, U.S. Pat. No. 5,318,990 and US-A-2007/0173588.

Another group of non-phenol-formaldehyde adhesives are the addition/-elimination reaction products of aliphatic and/or aromatic anhydrides with alkanolamines, e.g., as disclosed in WO 99/36368, WO 01/05725, WO 01/96460, WO 02/06178, WO 2004/007615 and WO 2006/061249. These adhesive compositions are water soluble and exhibit excellent binding properties in terms of curing speed and curing density.

WO 2008/023032 discloses urea-modified adhesives of that type which provide mineral wool products having reduced moisture take-up.

These could in principle be used as adhesives for the facing on a batt of man-made vitreous fibres in a matrix comprising a binder. However, since some of the starting materials used in the production of these adhesives are rather expensive chemicals, there is an ongoing need to provide formaldehyde-free adhesives which are economically produced.

A further effect in connection with previously known aqueous adhesive compositions for mineral fibre products is that at least the majority of the starting materials used for the production of these adhesives stem from fossil fuels. There is an ongoing trend of consumers to prefer products that are fully or at least partly produced from renewable materials and there is therefore a need to provide adhesives for mineral fibre or mineral wool products which are, at least partly, produced from renewable materials.

A further effect in connection with previously known aqueous adhesive compositions for mineral fibre products is that they involve components which are corrosive and/or harmful. This requires protective measures for the machinery involved in the production of mineral wool products to prevent corrosion and also requires safety measures for the persons handling this machinery. This leads to increased costs and health issues and there is therefore a need to provide adhesive compositions with a reduced content of corrosive and/or harmful materials.

In the meantime, a number of adhesives for mineral fibre products have been provided, which are to a large extent based on renewable starting materials. In many cases these adhesives based to a large extent on renewable resources are also formaldehyde-free.

However, many of these adhesives are still comparatively expensive because they are based on comparatively expensive basic materials and so their use as adhesives for bonding a facing to an insulation element would be uneconomical.

Accordingly, it is an object of the present invention to provide an adhesive composition which is particularly suitable for bonding a facing to a batt of man-made vitreous fibres in a matrix comprising binder, which uses renewable materials as starting materials, reduces or eliminates corrosive and/or harmful materials, and is comparatively inexpensive to produce.

A further object of the present invention is to provide an insulation product formed of a batt of man-made vitreous fibres in a matrix comprising binder, having bonded to it a facing, wherein the adhesion properties are good, and in particular as good as those provided by phenol-formaldehyde binder, but which minimises the disadvantages of phenol-formaldehyde binder.

According to a first aspect of the invention we provide a method of making an insulation product, the method comprising:

- providing a batt of man-made vitreous fibres (MMVF) in a matrix comprising a binder, wherein the batt of man-made vitreous fibres comprises at least one major surface;
- providing a facing;
- fixing the facing to at least one major surface of the batt of man-made vitreous fibres by the use of an adhesive; and
- curing the adhesive, wherein the adhesive: is an aqueous adhesive composition
- which is free of phenol and formaldehyde and comprises:
  - a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins,
  - a component (ii) in form of one or more cross-linkers.

In this aspect of the invention we use an adhesive as defined above. This has the advantage that it gives adhesion properties which are commercially acceptable, and indeed as good as those of phenol-formaldehyde resin, but without the attendant disadvantages.

According to a second aspect of the invention we provide a method of making an insulation product, the method comprising:

- providing a batt of man-made vitreous fibres (MMVF) comprising uncured binder, wherein the batt of man-made vitreous fibres comprises at least one major surface;

providing a facing;

applying the facing to at least one major surface of the batt of man-made vitreous fibres; and curing the binder so as to fix the facing to the major surface, wherein the binder is an aqueous binder composition which is free of phenol and formaldehyde and comprises:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers.

In this aspect of the invention we use a binder as defined above. This has the advantage that it gives binder properties, and adhesion of the facing to the batt, which are commercially acceptable, and indeed as good as those of phenol-formaldehyde resin, but without the attendant disadvantages.

The compression and delamination strength of the batt is comparable to batts bonded with phenol-formaldehyde resin and thereby better than known formaldehyde-free binders. This gives the advantages of decreased sagging, and better handling as well as improved adhesion. Water absorption and moisture resistance can also be similar to those of batts bonded with phenol-formaldehyde resin; this presents no limitation on indoor use, as there is no emission of formaldehyde, and an improved indoor climate compared to batts bonded with phenol-formaldehyde resin.

According to a third aspect of the invention we provide an insulation product obtained by the method according to the first or second aspect of the invention.

According to a fourth aspect of the invention we provide an insulation element which is a batt of man-made vitreous fibres (MMVF) bonded with a binder, wherein the batt of man-made vitreous fibres comprises at least one major surface, and comprising a facing, wherein the facing is fixed to at least one major surface of the insulation element by an adhesive, wherein the adhesive before curing has a composition which is free of phenol and formaldehyde and comprises:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers.

A preferred method of making the insulation products comprises carrying out the fixing of the facing to at least one major surface of the batt when the binder for the MMVF is uncured, and the step of curing the adhesive also cures the binder in the matrix of MMVF.

The insulation products formed according to the method of the first and second aspects of the invention or according to the third and fourth aspects of the invention can be bonded together to form a composite insulation product.

The insulation products can be formed into an external façade, a ventilated façade, an interior ceiling insulation product, an interior wall insulation product, a roof insulation product, a ventilation duct or channel acoustic absorption product.

The insulation product may be formed into an external façade insulation product. The external façade insulation product may be used to insulate a cavity wall. The external façade insulation product may be used to insulate a ventilated façade. The insulation product may have a density in the range of 20 to 80 kg/m$^3$, preferably 30 to 70 kg/m$^3$. The insulation product may have a loss on ignition in the range of 2 to 5 wt %, preferably 2.5 to 4 wt %. Preferably, the facing is a non-woven glass veil having an area weight between 30 to 150 g/m$^2$, preferably from 30 to 100 g/m$^2$.

The insulation products may be used as absorption material in sound attenuators and splitters, air conditioning, and ventilation systems. The insulation product may have a density in the range of 30 to 150 kg/m$^3$. The insulation product may have a loss on ignition in the range of 1.5 to 4 wt %, preferably 2 to 3 wt %. Preferably, the facing is a glass fibre silk veil having an area weight between 90 to 180 g/m$^2$.

The insulation products may be used to insulate heating ventilation and air conditioning systems. The insulation product may have a density in the range of 30 to 150 kg/m$^3$. The insulation product may have a loss on ignition in the range of 1.5 to 4 wt %, preferably 2 to 3 wt %. Preferably, the facing is a non-woven glass veil having an area weight between 30 to 150 g/m$^2$, preferably 30 to 100 g/m$^2$.

The insulation product or the insulation element may be formed into a thermal insulation system.

The thermal insulation system may be used to thermally insulate an inner or outer wall of a building. The thermal insulation system may be used to thermally insulate exterior ceilings of heated buildings. In both of these applications, the insulation products act so as to reduce heat losses by transmission from the interior of the building.

For thermal insulation systems, like e.g. External Thermal Insulation Composite Systems (ETICS), that are used to thermally insulate an outer wall of a building, insulation products might be placed on the outer wall in two layers, a layer facing the wall and an outward facing layer, and insulation products from the layer facing the wall are bonded to outward-facing layers with the adhesive. This might be done on-site but preferably the two layers are pre-assembled at the factory and adhered to each other according to the methods as described.

Such thermal insulation systems may comprise a thermal insulation product that is adhesively bonded to the outside of a building. Layers of render are applied to the insulation product in order to protect the insulation product against weathering influences. It is usual to apply a base render which is reinforced with a woven fabric layer and which is covered by a layer of covering render. Both render layers together are applied in thicknesses of from about 2 to about 7 mm, preferably less than 3 mm, when synthetic resin renders are used, while mineral render systems can reach thicknesses in the range from about 8 mm to about 20 mm. Insulation products generally have to be secured, i.e. joined to the exterior wall, by means of insulation fasteners. Here, partial adhesive bonding of the insulation products to the supporting substrate, namely the outer wall, serves only to aid mounting, with the stiffness of the insulation products to withstand the shear stresses resulting from shrinkage of the render being increased at the same time.

The thermal insulation system may comprise an insulation product or insulation element wherein the insulation product or insulation element further comprises an aerogel.

The thermal insulation system may comprise at least two insulation products, with each insulation product containing from 25 to 95% by weight of aerogel and from 5 to 75% by weight of inorganic fibres and from 0 to 70% by weight of inorganic fillers. The thermal insulation products may be joined to one another by means of an adhesive. Suitable aerogels are detailed in WO 2012/098463.

The insulation products formed according to the method of the first and second aspects of the invention or according to the third and fourth aspects of the invention may be used for thermal and/or acoustic insulation of flat roofs or flat inclined roofs. The insulation products may be formed into a roofing system.

When the insulation products are used in roofing applications the insulation product may be standard laminar or crimped base insulation product. The insulation product may have a density in the range of 100 to 200 kg/$m^3$, preferably 140 to 180 kg/$m^3$. The insulation product may have a loss on ignition in the range of 3 to 8 wt %, preferably 3.5 to 5 wt %. Preferably, the facing is a mineral coated non-woven glass veil having an area weight between 150 to 350 g/$m^2$.

When the insulation products are used in roofing applications the insulation product may be a lamella-like base insulation product. The insulation product may have a density in the range of 80 to 120 kg/$m^3$. The insulation product may have a loss on ignition in the range of 3 to 8 wt %, preferably 3.5 to 5 wt %. Preferably, the facing is a mineral coated non-woven glass veil having an area weight between 150 to 350 g/$m^2$.

The roofing system may comprise at least one insulation product formed according to the method of the first and second aspects of the invention or according to the third and fourth aspects of the invention, a substructure carrying the insulation product and a membrane covering a major surface to the insulation product. Preferably the membrane is a waterproof membrane.

The roofing system may be for the so-called warm roofs in which the principal thermal insulation is placed immediately below a roof covering, namely a waterproof membrane. The three principal options for attachment of single ply roofing systems are mechanical fastening, adhesion/cold gluing, ballast whereby the insulation and the membrane may be either attached by the same or a different method.

Preferably, the roofing system comprises an insulation product that comprises a mineral coated non-woven glass veil facing, more preferably the facing has an area weight between 150 g/$m^2$ to 350 g/$m^2$.

The roofing system may be used to insulate a flat roof structure whereby the insulation products are laid out on the flat roof in two layers, a top and bottom layer, and insulation products from the top layer are bonded to insulation products from the bottom layer with an adhesive.

The insulation products may comprise structural composites, which provide excellent strength and stability and often comprise engineered wood products, in addition to the thermal insulation elements of the invention.

The method of the invention comprises providing a batt of man-made vitreous fibres comprising a binder. This can be in the form of an insulation element. The batt of man-made vitreous fibres can be made by casting wet or fluid materials (for instance they can be made from wet laid mineral fibres) but it is preferred to form insulation elements of air laid mineral fibres, usually bonded in a matrix with a binder.

The binder can be any of the binders known for use in bonding MMVF. Preferably the binder is an organic binder such as phenol formaldehyde binder, urea formaldehyde binder, phenol urea formaldehyde binder or melamine formaldehyde binder. Conventionally-used phenol-formaldehyde or phenol-urea-formaldehyde (PUF) based resol binders optionally contain a sugar component. For these binders, without sugar component, reference is for example made to EP 0148050 and EP 0996653. For these binders, with sugar component, reference is made to WO 2012/076462. It can be a formaldehyde-free binder such as, for instance, the binder compositions based on polycarboxy polymers and polyols or polyamines, such as disclosed in EP-A-583086, EP-A-990727, EP-A-1741726, U.S. Pat. No. 5,318,990 and US-A-2007/0173588.

Another group of non-phenol-formaldehyde binders that can be used in the MMVF matrix are the addition/-elimination reaction products of aliphatic and/or aromatic anhydrides with alkanolamines, e.g., as disclosed in WO 99/36368, WO 01/05725, WO 01/96460, WO 02/06178, WO 2004/007615 and WO 2006/061249. These binder compositions are water soluble and exhibit excellent binding properties in terms of curing speed and curing density. WO 2008/023032 discloses urea-modified binders of that type which provide mineral wool products having reduced moisture take-up.

Preferably the binder for the MMVF is an aqueous adhesive composition which is free of phenol and formaldehyde and comprises:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers.

Further preferred features of the binder are described below in the context of the material used as the adhesive. All of the same preferred features are applicable when a material in this class is used as binder for a batt of man-made vitreous fibres comprising a binder.

The density of the batt of man-made vitreous fibres in a matrix comprising a binder is preferably in the range 6 to 350 kg/$m^3$, preferably 20 to 200 kg/$m^3$. The preferred density depends on the intended use, as discussed above.

The MMVF products generally have a loss on ignition (LOI) within the range of 0.5 to 8%, preferably 2 to 5 wt %. The LOI is taken as the binder content, in conventional manner determined according to European Standard EN 13820:2003. Binder will normally include minor amounts of oil and other organic binder additives in addition to the main bonding components.

The mineral fibres in the batt of man-made vitreous fibres in a matrix comprising a binder generally have average fibre diameter in the range 3 to 8 microns.

The man-made vitreous fibres (MMVF) used in the invention can be any MMVF such as, e.g., glass fibres, ceramic fibres, basalt fibres, slag wool, mineral wool and stone wool, which are bonded together by a cured binder. Bonded MMVF (also described as mineral fibres) are generally produced by converting a melt made of suitable raw materials to fibres in conventional manner, for instance by a spinning cup process or by a cascade rotor process. The fibres are blown into a forming chamber and, while airborne and while still hot, are sprayed with binder solution and randomly deposited as a mat or web onto a travelling conveyor. The fibre mat is then transferred to a curing oven where heated air is blown through the mat to cure the binder and rigidly bond the mineral fibres together.

The product of the present invention uses an aqueous adhesive (optionally also a binder) composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers.

In particular, the adhesive is an aqueous composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers, with the proviso that the aqueous composition does not comprise a cross-linker selected from epoxy compounds having a molecular weight $M_W$ of 500 or less.

In particular, the adhesive is an aqueous composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers, with the proviso that the aqueous composition does not comprise a cross-linker selected from carbonyl compounds selected from aldehydes, carbonyl compounds of the formula $R—[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10.

In particular, the adhesive is an aqueous composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers, with the proviso that the aqueous composition does not comprise a cross-linker selected from polyamines.

In particular, the adhesive is an aqueous composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers, with the proviso that the aqueous composition does not comprise a cross-linker selected from mono- and oligosaccharides.

In one embodiment, the adhesive is an aqueous composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers selected from β-hydroxyalkylamide-cross-linkers, such as N-(2-hydroxyisopropyl)amide-cross-linkers, such as N-(2-hydroxyethyl)amide-cross-linkers, such as N-(2-hydroxyethyl)adipamide-cross-linkers, such as N,N,N',N'-tetrakis(2-hydroxyethyl)adipamide and/or the group consisting of multifunctional organic amines such as an alkanolamine, diamines, such as hexamethyldiamine, and/or epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups, and/or one or more cross-linkers in form of multifunctional carbodiimides, such as aliphatic multifunctional carbodiimides, and/or Primid XL-552, with the proviso that the aqueous composition does not comprise a cross-linker selected from epoxy compounds having a molecular weight $M_W$ of 500 or less carbonyl compounds selected from aldehydes, carbonyl compounds of the formula $R—[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10, polyamines.

Optionally, the aqueous composition additionally comprises a component (iii) in form of one or more plasticizers.

In one embodiment, the adhesive is an aqueous composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iii) in form of one or more plasticizers.

In particular, the adhesive is an aqueous composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iii) in form of one or more plasticizers, with the proviso that the aqueous binder composition does not comprise a cross-linker selected from epoxy compounds having a molecular weight $M_W$ of 500 or less.

In particular, the adhesive is an aqueous composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iii) in form of one or more plasticizers, with the proviso that the aqueous composition does not comprise a cross-linker selected from carbonyl compounds selected from aldehydes, carbonyl compounds of the formula $R—[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10.

In particular, the adhesive is an aqueous composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iii) in form of one or more plasticizers, with the proviso that the aqueous composition does not comprise a cross-linker selected from polyamines.

In particular, the adhesive is an aqueous composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iii) in form of one or more plasticizers, with the proviso that the aqueous composition does not comprise a cross-linker selected from mono- and oligosaccharides.

In one embodiment, the adhesive is an aqueous composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers selected from β-hydroxyalkylamide-cross-linkers, and/or epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups, and/or one or more cross-linkers in form of multifunctional carbodiimides, such as aliphatic multifunctional carbodiimides; and/or Primid XL-552;

a component (iii) in form of one or more plasticizers, with the proviso that the aqueous composition does not comprise a cross-linker selected from epoxy compounds having a molecular weight $M_W$ of 500 or less carbonyl compounds selected from aldehydes, carbonyl compounds of the formula $R—[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10, polyamines.

In a preferred embodiment, the adhesives are formaldehyde free.

For the purpose of the present application, the term "formaldehyde free" is defined to characterize a mineral wool product where the emission is below 5 $\mu g/m^2/h$ of formaldehyde from the mineral wool product, preferably below 3 $\mu g/m^2/h$. Preferably, the test is carried out in accordance with ISO 16000 for testing aldehyde emissions.

In a preferred embodiment, the adhesives are phenol free.

For the purpose of the present application, the term "phenol free" is defined in such a way that the aqueous composition contains phenol

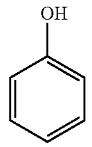

in an amount of ≤0.25 wt.-%, such as ≤0.1 wt.-%, such as ≤0.05 wt.-%, based on the total weight of an aqueous composition having a dry solids binder content of 15 wt. %.

In one embodiment, the adhesive composition does not contain added formaldehyde.

In one embodiment, the adhesive composition does not contain added phenol.

For the purpose of the present invention, the term "mono- and oligosaccharides" is defined to comprise monosaccharides and oligosaccharides having 10 or less saccharide units.

For the purpose of the present invention, the term "sugar" is defined to comprise monosaccharides and oligosaccharides having 10 or less saccharide units.

Component (i)

Component (i) is in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins.

Lignin, cellulose and hemicellulose are the three main organic compounds in a plant cell wall. Lignin can be thought of as the glue, that holds the cellulose fibres together. Lignin contains both hydrophilic and hydrophobic groups. It is the second most abundant natural polymer in the world, second only to cellulose, and is estimated to represent as much as 20-30% of the total carbon contained in the biomass, which is more than 1 billion tons globally.

The lignosulfonate process introduces large amount of sulfonate groups making the lignin soluble in water but also in acidic water solutions. Lignosulfonate has up to 8% sulfur as sulfonate, whereas kraft lignin has 1-2% sulfur, mostly bonded to the lignin. The molecular weight of lignosulfonate is 15.000-50.000 g/mol. The typical hydrophobic core of lignin together with large number of ionized sulfonate groups make this lignin attractive as a surfactant and it often finds application in dispersing cement etc.

To produce lignin-based value-added products, lignin should be first separated from biomass, for which several methods can be employed. Kraft and sulfite pulping processes are known for their effective lignin separation from wood, and hence, are used worldwide. Kraft lignin is separated from wood with the help of NaOH and Na2S. Lignins from sulfite pulping processes are denoted as lignosulfonates, and are produced by using sulfurous acid and/or a sulfite salt containing magnesium, calcium, sodium, or ammonium at varying pH levels. Currently, lignosulfonates account for 90% of the total market of commercial lignin, and the total annual worldwide production of lignosulfonates is approximately 1.8 million tons. Lignosulfonates have generally abundance of sulfonic groups, and thus, a higher amount of sulfur than kraft lignin. Due to the presence of the sulfonated group, lignosulfonates are anionically charged and water soluble. The molecular weights ($M_W$) of lignosulfonates can be similar to or larger than that of kraft lignin. Due to their unique properties, lignosulfonates have a wide range of uses, such as animal feed, pesticides, surfactants, additives in oil drilling, stabilizers in colloidal suspensions, and as plasticizers in concrete admixtures. However, the majority of new pulp mills employ kraft technology for pulp production, and thus, kraft lignin is more readily available for value-added production.

However, lignosulfonates and kraft lignin have different properties coming from different isolation processes and thus distribution of functional groups. High level of sulfonic groups in lignosulfonates, generally at least one for every four $C_9$ units, makes lignosulfonates strongly charged at all pH levels in water. This abundance of ionisable functional groups can explain most of the differences compared to other technical lignins. Higher charge density allows easier water solubility and higher solid content in solution possible compared to kraft lignin. Also, for the same reason, lignosulfonates will have lower solution viscosity compared to kraft lignin at the same solid content which can facilitate handling and processing. Commonly used model structure of lignosulfonates is shown in FIG. 1.

In one embodiment, component (i) is having a carboxylic acid group content of 0.05 to 0.6 mmol/g, such as 0.1 to 0.4 mmol/g, based on the dry weight of lignosulfonate lignins.

In one embodiment, component (i) is in form of one or more lignosulfonate lignins having an average carboxylic acid group content of less than 1.8 groups per macromolecule considering the M_n wt. average of component (i), such as less than 1.4 such as less than 1.1 such as less than 0.7 such as less than 0.4.

In one embodiment, component (i) is having a content of phenolic OH groups of 0.3 to 2.5 mmol/g, such as 0.5 to 2.0 mmol/g, such as 0.5 to 1.5 mmol/g. based on the dry weight of lignosulfonate lignins.

In one embodiment, component (i) is having a content of aliphatic OH groups of 1.0 to 8.0 mmol/g, such as 1.5 to 6.0 mmol/g, such as 2.0 to 5.0 mmol/g, based on the dry weight of lignosulfonate lignins.

In one embodiment, component (i) comprises ammoniumlignosulfonates and/or calciumlignosulfonates, and/or magnesiumlignosulfonates, and any combinations thereof.

In one embodiment, component (i) comprises ammoniumlignosulfonates and calciumlignosulfonates, wherein the molar ratio of $NH_4^+$ to $Ca^{2+}$ is in the range of 5:1 to 1:5, in particular 3:1 to 1:3.

For the purpose of the present invention, the term lignosulfonates encompasses sulfonated kraft lignins.

In one embodiment, component (i) is a sulfonated kraft lignin.

In one embodiment, the aqueous composition contains added sugar in an amount of 0 to 5 wt.-%, such as less than 5 wt.-%, such as 0 to 4.9 wt.-%, such as 0.1 to 4.9 wt.-%, based on the weight of lignosulfonate and sugar.

In one embodiment, the aqueous composition comprises component (i), i.e. the lignosulfonate, in an amount of 50 to 98 wt.-%, such as 65 to 98 wt.-%, such as 80 to 98 wt.-%, based on the total weight of components (i) and (ii).

In one embodiment, the aqueous composition comprises component (i) in an amount of 50 to 98 wt.-%, such as 65 to 98 wt.-%, such as 80 to 98 wt.-%, based on the dry weight of components (i), (ii), and (iii).

For the purpose of the present invention, content of lignin functional groups is determined by using $^{31}P$ NMR as characterization method.

Sample preparation for $^{31}P$ NMR is performed by using 2-chloro-4,4,5,5-tetramethyl-1,3,2-dioxaphospholane (TMDP) as phosphitylation reagent and cholesterol as internal standard. Integration is according to the work of Granata and Argyropoulos (J. Agric. Food Chem. 43:1538-1544).

Component (ii)

Component (ii) is in form of one or more cross-linkers.

In one embodiment, the component (ii) comprises in one embodiment one or more cross-linkers selected from β-hydroxyalkylamide-cross-linkers and/or oxazoline-cross-linkers.

β-hydroxyalkylamide-cross-linkers is a curing agent for the acid-functional macromolecules. It provides a hard, durable, corrosion resistant and solvent resistant cross-linked polymer network. It is believed the β-hydroxyalkylamide cross-linkers cure through esterification reaction to form multiple ester linkages. The hydroxy functionality of the β-hydroxyalkylamide-cross-linkers should be an average of at least 2, preferably greater than 2 and more preferably 2-4 in order to obtain optimum curing response.

Oxazoline group containing cross-linkers are polymers containing one of more oxazoline groups in each molecule and generally, oxazoline containing cross-linkers can easily be obtained by polymerizing an oxazoline derivative. The patent U.S. Pat. No. 6,818,699 B2 provides a disclosure for such a process.

In one embodiment, the component (ii) is one or more epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups, such as β-hydroxyalkylamide groups.

In one embodiment, component (ii) is one or more cross-linkers selected from the group consisting of fatty amines.

In one embodiment, component (ii) is one or more cross-linkers in form of fatty amides.

In one embodiment, component (ii) is one or more cross-linkers selected from polyester polyols, such as polycaprolactone.

In one embodiment, component (ii) is one or more cross-linkers selected from the group consisting of starch, modified starch, CMC.

In one embodiment, component (ii) is one or more cross-linkers in form of multifunctional carbodiimides, such as aliphatic multifunctional carbodiimides.

In one embodiment, the component (ii) is one or more cross-linkers in form of aziridines, such as CX100, NeoAdd-Pax 521/523.

In one embodiment, component (ii) is one or more cross-linkers selected from melamine based cross-linkers, such as a hexakis(methylmethoxy)melamine (HMMM) based cross-linkers.

Examples of such compounds are Picassian XL 701, 702, 725 (Stahl Polymers), such as ZOLDINE® XL-29SE (Angus Chemical Company), such as CX300 (DSM), such as Carbodilite V-02-L2 (Nisshinbo Chemical Inc.).

In one embodiment, component (ii) is Primid XL552, which has the following structure:

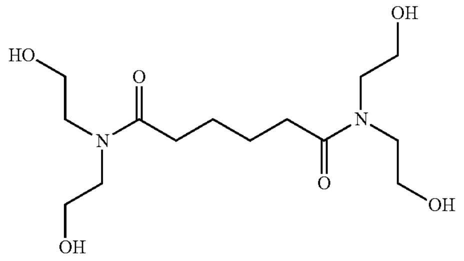

Primid XL-SS2

Component (ii) can also be any mixture of the above mentioned compounds.

In one embodiment, the adhesive composition comprises component (ii) in an amount of 1 to 50 wt.-%, such as 4 to 20 wt.-%, such as 6 to 12 wt.-%, based on the dry weight of component (i).

In one embodiment, component (ii) is in form of one or more cross-linkers selected from β-hydroxyalkylamide-cross-linkers, such as N-(2-hydroxyisopropyl)amide-cross-linkers, such as N-(2-hydroxyethyl)amide-cross-linkers, such as N-(2-hydroxyethyl)adipamide-cross-linkers, such as N,N, N',N'-tetrakis(2-hydroxyethyl)adipamide and/or the group consisting of multifunctional organic amines such as an alkanolamine, diamines, such as hexamethyldiamine, and/or epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups, and/or one or more cross-linkers in form of multifunctional carbodiimides, such as aliphatic multifunctional carbodiimides.

In one embodiment, component (ii) comprises one or more cross-linkers selected from β-hydroxyalkylamide-cross-linkers, such as N-(2-hydroxyisopropyl)amide-cross-linkers, such as N-(2-hydroxyethyl)amide-cross-linkers, such as N-(2-hydroxyethyl)adipamide-cross-linkers, such as N,N, N',N'-tetrakis(2-hydroxyethyl)adipamide.

In one embodiment, component (ii) comprises component (ii) in an amount of 2 to 90 wt.-%, such as 6 to 60 wt.-%, such as 10 to 40 wt.-%, such as 25 to 40 wt.-%, based on the dry weight of component (i).

Component (iii) of the Adhesive Composition

The adhesive composition may comprise a component (iii). Component (iii) is in form of one or more plasticizers.

In one embodiment, component (iii) is in form of one or more plasticizers selected from the group consisting of polyols, such as carbohydrates, hydrogenated sugars, such as sorbitol, erythriol, glycerol, monoethylene glycol, polyethylene glycols, polyethylene glycol ethers, polyethers, phthalates and/or acids, such as adipic acid, vanillic acid, lactic acid and/or ferulic acid, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups, polyamides, amides such as carbamide/urea, or any mixtures thereof.

In one embodiment, component (iii) is in form of one or more plasticizers selected from the group consisting of carbonates, such as ethylene carbonate, propylene carbonate, lactones, lactams, lactides, compounds with a structure similar to lignin like vanillin, acetosyringone, solvents used as coalescing agents like alcohol ethers, polyvinyl alcohol.

In one embodiment, component (iii) is in form of one or more non-reactive plasticizer selected from the group consisting of polyethylene glycols, polyethylene glycol ethers, polyethers, hydrogenated sugars, phthalates and/or other esters, solvents used as coalescing agents like alcohol ethers, acrylic polymers, polyvinyl alcohol.

In one embodiment, component (iii) is one or more reactive plasticizers selected from the group consisting of carbonates, such as ethylene carbonate, propylene carbonate, lactones, lactams, lactides, di- or tricarboxylic acids, such as adipic acid, or lactic acid, and/or vanillic acid and/or ferulic acid, polyurethane dispersions, acrylic based polymers with free carboxy groups, compounds with a structure similar to lignin like vanillin, acetosyringone.

In one embodiment, component (iii) is in form of one or more plasticizers selected from the group consisting of fatty alcohols, monohydroxy alcohols such as pentanol, stearyl alcohol.

In one embodiment, component (iii) comprises one or more plasticizers selected from the group consisting of polyethylene glycols, polyethylene glycol ethers, and/or one or more plasticizers in form of polyols, such as 1,1,1-Tris (hydroxymethyl)propane, and/or triethanolamine.

Another particular surprising aspect of the adhesive composition used in the present invention is that the use of plasticizers having a boiling point of more than 100° C., in particular 140 to 250° C., strongly improves the mechanical properties of the product of the present invention although, in view of their boiling point, it is likely that these plasticizers will at least in part evaporate during the curing of the adhesive in contact with the mineral fibres.

In one embodiment, component (iii) comprises one or more plasticizers having a boiling point of more than 100° C., such as 110 to 380° C., more preferred 120 to 300° C., more preferred 140 to 250° C.

It is believed that the effectiveness of these plasticizers in the adhesive composition is associated with the effect of increasing the mobility of the lignins during the curing process. It is believed that the increased mobility of the lignins during the curing process facilitates the effective cross-linking.

In one embodiment, component (iii) comprises one or more polyethylene glycols having an average molecular weight of 150 to 50000 g/mol, in particular 150 to 4000 g/mol, more particular 150 to 1000 g/mol, preferably 150 to 500 g/mol, more preferably 200 to 400 g/mol.

In one embodiment, component (iii) comprises one or more polyethylene glycols having an average molecular weight of 4000 to 25000 g/mol, in particular 4000 to 15000 g/mol, more particular 8000 to 12000 g/mol.

In one embodiment component (iii) is capable of forming covalent bonds with component (i) and/or component (ii) during the curing process. Such a component would not evaporate and remain as part of the composition but will be effectively altered to not introduce unwanted side effects e.g. water absorption in the cured product. Non-limiting examples of such a component are caprolactone and acrylic based polymers with free carboxyl groups.

In one embodiment, component (iii) is selected from the group consisting of fatty alcohols, monohydroxy alcohols, such as pentanol, stearyl alcohol.

In one embodiment, component (iii) is selected from one or more plasticizers selected from the group consisting of alkoxylates such as ethoxylates such as butanol ethoxylates, such as butoxytriglycol.

In one embodiment, component (iii) is selected from one or more propylene glycols.

In one embodiment, component (iii) is selected from one or more glycol esters.

In one embodiment, component (iii) is selected from one or more plasticizers selected from the group consisting of adipates, acetates, benzoates, cyclobenzoates, citrates, stearates, sorbates, sebacates, azelates, butyrates, valerates.

In one embodiment, component (iii) is selected from one or more plasticizers selected from the group consisting of phenol derivatives such as alkyl or aryl substituted phenols.

In one embodiment, component (iii) is selected from one or more plasticizers selected from the group consisting of silanols, siloxanes.

In one embodiment, component (iii) is selected from one or more plasticizers selected from the group consisting of sulfates such as alkyl sulfates, sulfonates such as alkyl aryl sulfonates such as alkyl sulfonates, phosphates such as tripolyphosphates; such as tributylphosphates.

In one embodiment, component (iii) is selected from one or more hydroxy acids.

In one embodiment, component (iii) is selected from one or more plasticizers selected from the group consisting of monomeric amides such as acetamides, benzamide, fatty acid amides such as tall oil amides.

In one embodiment, component (iii) is selected from one or more plasticizers selected from the group consisting of quaternary ammonium compounds such as trimethylglycine, distearyldimethylammoniumchloride.

In one embodiment, component (iii) is selected from one or more plasticizers selected from the group consisting of vegetable oils such as castor oil, palm oil, linseed oil, tall oil, soybean oil.

In one embodiment, component (iii) is in form of tall oil.

In one embodiment, component (iii) is selected from one or more plasticizers selected from the group consisting of hydrogenated oils, acetylated oils.

In one embodiment, component (iii) is selected from one or more fatty acid methyl esters.

In one embodiment, component (iii) is selected from one or more plasticizers selected from the group consisting of alkyl polyglucosides, gluconamides, aminoglucoseamides, sucrose esters, sorbitan esters.

In one embodiment, component (iii) is selected from the group consisting of polyethylene glycols, polyethylene glycol ethers.

In one embodiment, component (iii) is selected from the group consisting of triethanolamine.

In one embodiment, component (iii) is in form of propylene glycols, phenol derivatives, silanols, siloxanes, hydroxy acids, vegetable oils, polyethylene glycols, polyethylene glycol ethers, and/or one or more plasticizers in form of polyols, such as 1,1,1-Tris(hydroxymethyl)propane, triethanolamine, or any mixtures thereof.

It has been found that the inclusion of plasticizers in the adhesive compositions may improve the mechanical properties of the product of the present invention.

The term plasticizer refers to a substance that is added to a material in order to make the material softer, more flexible (by decreasing the glass-transition temperature Tg) and easier to process.

Component (iii) can also be any mixture of the above mentioned compounds.

In one embodiment, component (iii) is present in an amount of 0.5 to 60, preferably 2.5 to 25, more preferably 3 to 15 wt.-%, based on the dry weight of component (i).

In one embodiment, component (iii) is present in an amount of 0.5 to 60, preferably 2.5 to 25, more preferably 3 to 15 wt.-%, based on the dry weight of components (i), (ii), and (iii).

Adhesive Resulting from the Curing of an Adhesive Composition Comprising Components (i) and (iia)

In one embodiment the adhesive composition comprises:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins.

a component (iia) in form of one or more modifiers, preferably with the proviso that the aqueous adhesive composition does not comprise a cross-linker selected from epoxy compounds having a molecular weight $M_W$ of 500 or less, and/or with the proviso that the aqueous adhesive composition does not comprise a cross-linker selected from carbonyl compounds selected from aldehydes, carbonyl compounds of the formula $R—[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10, and/or with the proviso that the aqueous adhesive composition does not comprise a cross-linker selected from polyamines, and/or with the proviso that the aqueous adhesive composition does not comprise a cross-linker selected from mono- and oligosaccharides.

The present inventors have found that the excellent adhesive properties can also be achieved by a two-component system which comprises component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins and a component (iia) in form of one or more modifiers, and optionally any of the other components mentioned above and below.

In one embodiment, component (iia) is a modifier in form of one or more compounds selected from the group consisting of epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups such as β-hydroxyalkylamide groups.

In one embodiment, component (iia) is one or more modifiers selected from the group consisting of polyethylene imine, polyvinyl amine, fatty amines.

In one embodiment, the component (iia) is one or more modifiers selected from multifunctional carbodiimides, such as aliphatic multifunctional carbodiimides.

Component (iia) can also be any mixture of the above mentioned compounds.

Without wanting to be bound by any particular theory, the present inventors believe that the excellent adhesive properties achieved by the adhesive composition comprising components (i) and (iia), and optional further components, are at least partly due to the effect that the modifiers used as components (iia) at least partly serve the function of a plasticizer and a cross-linker.

In one embodiment, the adhesive composition comprises component (iia) in an amount of 1 to 40 wt.-%, such as 4 to 20 wt.-%, such as 6 to 12 wt.-%, based on the dry weight of the component (i).

Further Components

In some embodiments, the adhesive comprises further components.

In one embodiment, the adhesive composition comprises a catalyst selected from inorganic acids, such as sulfuric acid, sulfamic acid, nitric acid, boric acid, hypophosphorous acid, and/or phosphoric acid, and/or any salts thereof such as sodium hypophosphite, and/or ammonium salts, such as ammonium salts of sulfuric acid, sulfamic acid, nitric acid, boric acid, hypophosphorous acid, and/or phosphoric acid, and/or sodium polyphosphate (STTP), and/or sodium metaphosphate (STMP), and/or phosphorous oxychloride. The presence of such a catalyst can improve the curing properties of the adhesive compositions.

In one embodiment, the adhesive composition comprises a catalyst selected from Lewis acids, which can accept an electron pair from a donor compound forming a Lewis adduct, such as $ZnCl_2$, $Mg(ClO_4)_2$, $Sn[N(SO_2\text{-}n\text{-}C_8F_{17})_2]_4$.

In one embodiment, the adhesive composition comprises a catalyst selected from metal chlorides, such as KCl, $MgCl_2$, $ZnCl_2$, $FeCl_3$ and $SnCl_2$ or their adducts such as $AlCl_3$ adducts, such as $BF_3$ adducts, such as $BF_3$ ethylamine complex.

In one embodiment, the adhesive composition comprises a catalyst selected from organometallic compounds, such as titanate-based catalysts and stannum based catalysts.

In one embodiment, the adhesive composition comprises a catalyst selected from chelating agents, such as transition metals, such as iron ions, chromium ions, manganese ions, copper ions and/or from peroxides such as organic peroxides such as dicumyl peroxide.

In one embodiment, the adhesive composition according to the present invention comprises a catalyst selected from phosphites such as alkyl phosphites, such as aryl phosphites such as triphenyl phosphite.

In one embodiment, the adhesive composition according to the present invention comprises a catalyst selected from the group of ternary amines such as tris-2,4,6-dimethylaminomethyl phenol.

In one embodiment, the adhesive composition further comprises a further component (iv) in form of one or more silanes.

In one embodiment, the adhesive composition comprises a further component (iv) in form of one or more coupling agents, such as organofunctional silanes.

In one embodiment, component (iv) is selected from group consisting of organofunctional silanes, such as primary or secondary amino functionalized silanes, epoxy functionalized silanes, such as polymeric or oligomeric epoxy functionalized silanes, methacrylate functionalized silanes, alkyl and aryl functionalized silanes, urea funtionalised silanes or vinyl functionalized silanes.

In one embodiment, the adhesive composition further comprises a component (v) in form of one or more components selected from the group of bases, such as ammonia, such as alkali metal hydroxides, such as KOH, such as earth alkaline metal hydroxides, such as $Ca(OH)_2$, such as $Mg(OH)_2$, such as amines or any salts thereof.

In one embodiment, the adhesive composition further comprises a further component in form of urea, in particular in an amount of 5 to 40 wt.-%, such as 10 to 30 wt.-%, 15 to 25 wt.-%, based on the dry weight of component (i).

In one embodiment, the adhesive composition comprises a further component in form of one or more carbohydrates selected from the group consisting of sucrose, reducing sugars, in particular dextrose, polycarbohydrates, and mixtures thereof, preferably dextrins and maltodextrins, more preferably glucose syrups, and more preferably glucose syrups with a dextrose equivalent value of DE=30 to less than 100, such as DE=60 to less than 100, such as DE=60-99, such as DE=85-99, such as DE=95-99.

In one embodiment, the adhesive composition comprises a further component in form of one or more carbohydrates selected from the group consisting of sucrose and reducing sugars in an amount of 5 to 50 wt.-%, such as 5 to less than 50 wt.-%, such as 10 to 40 wt.-%, such as 15 to 30 wt.-% based on the dry weight of component (i).

In one embodiment, the adhesive composition comprises a further component in form of one or more silicone resins.

In one embodiment, the adhesive composition according to the present invention comprises a further component (vi) in the form of one or more reactive or nonreactive silicones.

In one embodiment, the component (vi) is selected from the group consisting of silicone constituted of a main chain composed of organosiloxane residues, especially diphenylsiloxane residues, alkylsiloxane residues, preferably dimethylsiloxane residues, bearing at least one hydroxyl, carboxyl or anhydride, amine, epoxy or vinyl functional group capable of reacting with at least one of the constituents of the adhesive composition and is preferably present in an amount of 0.025-15 weight-%, preferably from 0.1-10 weight-%, more preferably 0.3-8 weight-%, based on the adhesive solids.

In one embodiment, the adhesive composition comprises a further component in form of one or more mineral oils.

In the context of the present invention, an adhesive composition having a sugar content of 50 wt.-% or more, based on the total dry weight of the adhesive components, is considered to be a sugar based adhesive. In the context of the present invention, a adhesive composition having a sugar content of less than 50 wt.-%, based on the total dry weight of the adhesive components, is considered a non-sugar based adhesive.

In one embodiment, the adhesive composition comprises a further component in form of one or more surface active agents that are in the form of non-ionic and/or ionic emulsifiers such as polyoxyethylenes (4) lauryl ether, such as soy lecithin, such as sodium dodecyl sulfate.

The use of lignin-based sulfonated products in adhesives may result in an increase in the hydrophilicity of some adhesive s and final products, meaning one or more hydrophobic agents are to be added, such as one or more mineral oils, such as one or more silicone oil, such as one or more silicone resin.

In one embodiment, the aqueous adhesive composition consists essentially of

- a component (i) in form of one or more lignins selected from the group of:
  - lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins,
  - and/or
- a component (ii) in form of one or more cross-linkers;
- a component (iii) in form of one or more plasticizers;
- a component (iv) in form of one or more coupling agents, such as organofunctional silanes;
- optionally a component in form of one or more compounds selected from the group of bases, such as ammonia, such as alkali metal hydroxides, such as KOH, such as earth alkaline metal hydroxides, such as $Ca(OH)_2$, such as $Mg(OH)_2$, such as amines or any salts thereof;
- optionally a component in form of urea;
- optionally a component in form of a more reactive or non-reactive silicones;
- optionally a hydrocarbon oil;
- optionally one or more surface active agents;
- water.

In one embodiment, the aqueous adhesive composition consists essentially of

- a component (i) in form of one or more lignins selected from the group of:
  - lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins,
  - and/or
- a component (ii) in form of one or more cross-linkers;
- a component (iv) in form of one or more coupling agents, such as organofunctional silanes;
- optionally a component in form of one or more compounds selected from the group of bases, such as ammonia, such as alkali metal hydroxides, such as KOH, such as earth alkaline metal hydroxides, such as $Ca(OH)_2$, such as $Mg(OH)_2$, such as amines or any salts thereof;
- optionally a component in form of urea;
- optionally a component in form of a more reactive or non-reactive silicones;
- optionally a hydrocarbon oil;
- optionally one or more surface active agents;
- water.

The present inventors have surprisingly found that mineral fibre products (such as products of the present invention) comprising an aqueous adhesive composition as it is described above when used as a binder in the mineral fibre products have a very high stability, both when freshly produced and after aging conditions.

Further, the present inventors have found that even higher product stability can be obtained by using a curing temperature of >230° C.

The present inventors have further found that the stability of the product can be further increased by the following measures:

- Lower line capacity, meaning longer curing time
- Addition of silicone resins
- Addition of high amounts of crosslinker
- Addition of a combination of two or more different crosslinkers
- Addition of small amounts of cationic species such as multivalent metal ions such as calcium and/or organic cationic species such as amines and/or organically modified inorganic compounds such as amine modified montmorillonite clays The mineral fibres employed may be any man-made vitreous fibres (MMVF), such as glass fibres, ceramic fibres, basalt fibres, slag fibres, rock fibres, stone fibres and others. These fibres may be present as a wool product, e.g. like a stone wool product.

Fibre/Melt Composition

The man-made vitreous fibres (MMVF) can have any suitable oxide composition. The fibres can be glass fibres, ceramic fibres, basalt fibres, slag fibres or rock or stone fibres. The fibres are preferably of the types generally known as rock, stone or slag fibres, most preferably stone fibres.

Stone fibres commonly comprise the following oxides, in percent by weight:

$SiO_2$: 30 to 51
$Al_2O_3$: 12 to 30
CaO: 8 to 30
MgO: 2 to 25
FeO (including $Fe_2O_3$): 2 to 15
Na2O+$K_2O$: not more than 10
CaO+MgO: 10 to 30

In preferred embodiments the MMVF have the following levels of elements, calculated as oxides in wt %:

$SiO_2$: at least 30, 32, 35 or 37; not more than 51, 48, 45 or 43
$Al_2O_3$: at least 12, 16 or 17; not more than 30, 27 or 25
CaO: at least 8 or 10; not more than 30, 25 or 20
MgO: at least 2 or 5; not more than 25, 20 or 15
FeO (including $Fe_2O_3$): at least 4 or 5; not more than 15, 12 or 10
FeO+MgO: at least 10, 12 or 15; not more than 30, 25 or 20

Na2O+$K_2O$: zero or at least 1; not more than 10

CaO+MgO: at least 10 or 15; not more than 30 or 25

TiO2: zero or at least 1; not more than 6, 4 or 2

$TiO_2$+FeO: at least 4 or 6; not more than 18 or 12

$B_2O_3$: zero or at least 1; not more than 5 or 3

$P_2O_5$: zero or at least 1; not more than 8 or 5

Others: zero or at least 1; not more than 8 or 5

The MMVF used in the invention preferably have the composition in wt.-%:

$SiO_2$ 35 to 50

$Al_2O_3$ 12 to 30

$TiO_2$ up to 2

$Fe_2O_3$ 3 to 12

CaO 5 to 30

MgO up to 15

$Na_2O$ 0 to 15

$K_2O$ 0 to 15

$P_2O_5$ up to 3

MnO up to 3

$B_2O_3$ up to 3

Another preferred composition for the MMVF is as follows in wt %:

$SiO_2$ 39-55% preferably 39-52%

$Al_2O_3$ 16-27% preferably 16-26%

CaO 6-20% preferably 8-18%

MgO 1-5% preferably 1-4.9%

$Na_2O$ 0-15% preferably 2-12%

$K_2O$ 0-15% preferably 2-12%

$R_2O$ ($Na_2O$+$K_2O$) 10-14.7% preferably 10-13.5%

$P_2O_5$ 0-3% preferably 0-2%

$Fe_2O_3$ (iron total) 3-15% preferably 3.2-8%

$B_2O_3$ 0-2% preferably 0-1%

$TiO_2$ 0-2% preferably 0.4-1%

Others 0-2.0%

Glass fibres commonly comprise the following oxides, in percent by weight:

$SiO_2$: 50 to 70

$Al_2O_3$: 10 to 30

CaO: not more than 27

MgO: not more than 12

Glass fibres can also contain the following oxides, in percent by weight:

$Na_2O$+$K_2O$: 8 to 18, in particular $Na_2O$+$K_2O$ greater than CaO+MgO $B_2O_3$: 3 to 12

Some glass fibre compositions can contain $Al_2O_3$: less than 2%.

The batt of man-made vitreous fibres in a matrix comprising binder, once cured, has first and second major faces which are essentially parallel (and extend in the XY direction). These are connected by minor faces, which are usually perpendicular to the major faces (and so extend in the Z direction).

The method of the invention involves provision of a mineral melt. A mineral melt is provided in a conventional manner by providing mineral materials and melting them in a furnace. This furnace can be any of the types of furnace known for production of mineral melts for MMVF, for instance a shaft furnace such as a cupola furnace, a tank furnace, or a cyclone furnace.

Any suitable method may be employed to form MMVF from the mineral melt by fiberization. The fiberization can be by a spinning cup process in which melt is centrifugally extruded through orifices in the walls of a rotating cup (spinning cup, also known as internal centrifugation). Alternatively the fiberization can be by centrifugal fiberization by projecting the melt onto and spinning off the outer surface of one fiberizing rotor, or off a cascade of a plurality of fiberizing rotors, which rotate about a substantially horizontal axis (cascade spinner).

The fiberization of the fibres is usually promoted by air blasts around the each rotor and the fibres are entrained by air and carried to a collector. Binder is sprayed on to the fibres, preferably before collection. Methods of this general type are well known and are particularly suitable for rock, stone or slag fibres. WO 96/38391 describes a preferred method of apparatus in detail and refers to extensive literature on fiberization processes which can also be used for making the fibres. Other suitable apparatus and processes are described in WO02/32821 and WO2015/055758.

The melt is thus formed into a cloud of fibres entrained in air and the fibres are collected as a web on a conveyor and carried away from the fiberizing apparatus. The web of fibres is then consolidated, which can involve cross-lapping and/or longitudinal compression and/or vertical compression and/or winding around a mandrel to produce a cylindrical product for pipe insulation. Other consolidation processes may also be performed.

The binder composition is applied to the fibres preferably when they are a cloud entrained in air. Alternatively it can be applied after collection on the conveyor but this is less preferred.

The facing is preferably applied to the first major surface before the step of curing the binder for the MMVF. This means that the adhesive for the facing can also be cured in the same curing step as the binder. However, it is also possible to apply the facing after the binder for the matrix of MMVF has been cured, and then conduct a step of curing the adhesive.

In one embodiment, the curing is carried out at temperatures from 100 to 300° C., such as 170 to 270° C., such as 180 to 250° C., such as 190 to 230° C.

In a preferred embodiment, the curing takes place in a conventional curing oven for mineral wool production, preferably operating at a temperature of from 150 to 300° C., such as 170 to 270° C., such as 180 to 250° C., such as 190 to 230° C.

In one embodiment, the curing takes place for a time of 30 seconds to 20 minutes, such as 1 to 15 minutes, such as 2 to 10 minutes.

In a typical embodiment, curing takes place at a temperature of 150 to 250° C. for a time of 30 seconds to 20 minutes.

The so-achieved insulation products of MMVF, also referred to as mineral wool products, and where used for thermal insulation of buildings are further specified according to harmonized European Standard EN 13162:2012+A1: 2015 *"Thermal insulation products for buildings-Factory made mineral wool (MW) products"*, defining respective requirements.

The insulation product has a thickness which is the perpendicular distance between the major faces of the product. This is usually in the range 20 to 400 mm, and varies according to the intended use, as discussed above.

The facing may independently be any of the materials known for use as a facing for an insulation product.

The facing may be flexible or rigid. Preferably it is a flexible facing. It may be a woven or non-woven glass fibre veils or fabrics, scrims, rovings, glass fibre silks, glass filament fabrics, spunbonded polyester webs, foils, vapour membranes, vapour barriers, roof underlay foils, aluminium foil and housewraps.

The facing may be a mineral coated non-woven glass veil. This type of facing may be used in instances where the veil or fabric provides additional strength or resilience to the insulation product.

A facing, for example a mineral coated non-woven glass fibre veil, may have an area weight in the range 150 to 350 $g/m^2$, preferably in the range 200 to 300 $g/m^2$.

The facing may be a glass fibre silk or glass filament fabric. This type of facing may be used in instances where the insulation product is employed as for acoustic absorption reasons, such as, in sound attenuators/splitters of air conditioning and ventilation systems. Glass fibre silk and glass fibre filament fabrics used for the above-mentioned applications need to fulfil certain fibre erosion and hygienic standards and are therefore more robust than non-wovens.

A facing, for example a glass fibre silk or glass filament fabric, may have an area weight in the range 90 to 180 $g/m^2$, preferably in the range 100 to 160 $g/m^2$.

Methods for applying facings to MMVF batts are known and can be used in the invention in the usual manner. When the facing is flexible it is commonly supplied from a roll. It is then adhered in-line to the MMVF batt in continuous manner.

In the method the adhesive is usually applied to the facing before the facing is brought into contact with the major surface of the batt of man-made vitreous fibres. It is however possible to apply the adhesive directly to the major surface of the batt of man-made vitreous fibres to which the facing is to be adhered.

Application weight is preferably in the range 40 to 400 $g/m^2$, preferably 50 to 200 $g/m^2$, more preferably 60 to 150 $g/m^2$ of a liquid adhesive.

Preferably the adhesive is applied by spraying. Another method of application is passing the facing through a coating bath containing adhesive.

The insulation product made according to the method of the invention, and the insulation product of the fourth aspect of the invention, can be used in any of the applications known for insulation products.

For instance it may be or form part of an external façade, a ventilated façade, an interior ceiling insulation product, an interior wall insulation product, a roof insulation product, a ventilation duct or channel acoustic absorption product.

The adhesive used according to the present invention is in the form of an aqueous composition. Preferred features are discussed below. The batt of MMVF bonded with a binder may also be of the type discussed below, and all the same preferred features apply.

ADHESIVE EXAMPLES

In the following examples, several adhesives which fall under the definition of the adhesive used in the present invention were prepared and compared to adhesives according to the prior art.

The following properties were determined for the adhesives used in the present invention and the adhesives according to the prior art, respectively:

Adhesive Component Solids Content

The content of each of the components in a given adhesive solution before curing is based on the anhydrous mass of the components.

Lignosulfonates were supplied by Borregaard, Norway and LignoTech, Florida as liquids with approximately 50% solid content. Primid XL552 was supplied by EMS-CHEMIE AG, Silane (Momentive VS-142 40% activity), was supplied by Momentive and was calculated as 100% for simplicity. Silicone resin BS 1052 was supplied by Wacker Chemie AG. NH4OH 24.7% was supplied by Univar and used in supplied form. PEG 200, urea, KOH pellets, 1,1,1 tris(hydroxymethyl)propane were supplied by Sigma-Aldrich and were assumed anhydrous for simplicity.

Adhesive Solids

The content of adhesive after curing is termed "adhesive solids".

Disc-shaped stone wool samples (diameter: 5 cm; height 1 cm) were cut out of stone wool and heat-treated at 580° C. for at least 30 minutes to remove all organics. The solids of the adhesive mixture was measured by distributing a sample of the adhesive mixture (approx. 2 g) onto a heat treated stone wool disc in a tin foil container. The weight of the tin foil container containing the stone wool disc was weighed before and directly after addition of the adhesive mixture. Two such adhesive mixture loaded stone wool discs in tin foil containers were produced and they were then heated at 200° C. for 1 hour. After cooling and storing at room temperature for 10 minutes, the samples were weighed and the adhesive solids was calculated as an average of the two results. A adhesive with a desired adhesive solids could then be produced by diluting with the required amount of water and 10% aq. silane (Momentive VS-142).

Mechanical Strength Studies

Bar Tests

The mechanical strength of the adhesives (when tested as binder for a MMVF matrix) was tested in a bar test. For each binder, 16 bars were manufactured from a mixture of the binder and stone wool shots from the stone wool spinning production.

A sample of this binder solution having 15% dry solid matter (16.0 g) was mixed well with shots (80.0 g). The resulting mixture was then filled into four slots in a heat resistant silicone form for making small bars (4×5 slots per form; slot top dimension: length=5.6 cm, width=2.5 cm; slot bottom dimension: length=5.3 cm, width=2.2 cm; slot height=1.1 cm). The mixtures placed in the slots were then pressed with a suitably sized flat metal bar to generate even bar surfaces. 16 bars from each binder were made in this fashion. The resulting bars were then cured typically at 225° C. The curing time was 1 h. After cooling to room temperature, the bars were carefully taken out of the containers. Five of the bars were aged in a water bath at 80° C. for 3 h. This method of curing the prepared bars was used for example in Tables 1.1, 1.2, 1.4, 1.5, 1.6. Results in Table 1.3 are based on a slightly different method which includes a preconditioning step of 2 h at 90° C., followed by curing for 1 h at 225° C. while the remaining of the procedure is the same.

After drying for 3 days, the aged bars as well as five unaged bars were broken in a 3 point bending test (test speed: 10.0 mm/min; rupture level: 50%; nominal strength: 30 $N/mm^2$; support distance: 40 mm; max deflection 20 mm; nominal e-module 10000 $N/mm^2$) on a Bent Tram machine to investigate their mechanical strengths. The bars were placed with the "top face" up (i.e. the face with the dimensions length=5.6 cm, width=2.5 cm) in the machine.

Adhesive Example, Reference Adhesive (Phenol-Formaldehyde Resin Modified with Urea, a PUF-Resol)

This adhesive is a phenol-formaldehyde resin modified with urea, a PUF-resol.

A phenol-formaldehyde resin is prepared by reacting 37% aq. formaldehyde (606 g) and phenol (189 g) in the presence of 46% aq. potassium hydroxide (25.5 g) at a reaction temperature of 84° C. preceded by a heating rate of approximately 1° C. per minute. The reaction is continued at 84° C. until the acid tolerance of the resin is 4 and most of the phenol is converted. Urea (241 g) is then added and the mixture is cooled.

The acid tolerance (AT) expresses the number of times a given volume of a adhesive can be diluted with acid without the mixture becoming cloudy (the adhesive precipitates). Sulfuric acid is used to determine the stop criterion in a adhesive production and an acid tolerance lower than 4 indicates the end of the adhesive reaction.

To measure the AT, a titrant is produced from diluting 2.5 ml conc. sulfuric acid (>99%) with 1 L ion exchanged water. 5 mL of the adhesive to be investigated is then titrated at room temperature with this titrant while keeping the adhesive in motion by manually shaking it; if preferred, use a magnetic stirrer and a magnetic stick. Titration is continued until a slight cloud appears in the adhesive, which does not disappear when the adhesive is shaken.

The acid tolerance (AT) is calculated by dividing the amount of acid used for the titration (mL) with the amount of sample (mL):

$$AT = (\text{Used titration volume (mL)})/(\text{Sample volume (mL)})$$

Using the urea-modified phenol-formaldehyde resin obtained, a adhesive is made by addition of 25% aq. ammonia (90 mL) and ammonium sulfate (13.2 g) followed by water (1.30 kg).

The adhesive solids were then measured as described above and the mixture was diluted with the required amount of water and silane for mechanical measurements (15% adhesive solids solution, 0.5% silane of adhesive solids).

Adhesive example, reference adhesive (adhesive based on alkali oxidized lignin) 3267 kg of water is charged in 6000 l reactor followed by 287 kg of ammonia water (24.7%). Then 1531 kg of Lignin UPM BioPiva 100 is slowly added over a period of 30 min to 45 min. The mixture is heated to 40° C. and kept at that temperature for 1 hour. After 1 hour a check is made on insolubilized lignin. This can be made by checking the solution on a glass plate or a Hegman gauge. Insolubilized lignin is seen as small particles in the brown adhesive. During the dissolution step will the lignin solution change color from brown to shiny black. After the lignin is completely dissolved, 1 liter of a foam dampening agent (Skumdæmper 11-10 from NCÅ-Verodan) is added. Temperature of the batch is maintained at 40° C. Then addition of 307.5 kg 35% hydrogen peroxide is started. The hydrogen peroxide is dosed at a rate of 200-300 l/h.

First half of the hydrogen peroxide is added at a rate of 200 l/h where after the dosage rate is increased to 300 l/h.

During the addition of hydrogen peroxide is the temperature in the reaction mixture controlled by heating or cooling in such a way that a final reaction temperature of 65° C. is reached.

The final product was analysed for the COOH group content, dry solid matter, pH, viscosity and remaining $H_2O_2$·60 g of this oxidized lignin (18.2% solids) was mixed with 1.4 g Primid XL552 (100% solids) and 2.8 g PEG200 (100% solids). 0.6 g Silane (Momentive VS-142 40% activity, 10% in water) and 17.4 g water were added and mixed to yield 15% solids and then used for test of mechanical properties in bar tests.

Adhesive Compositions for Use in the Present Invention

In the following, the entry numbers of the adhesive example correspond to the entry numbers used in Table 1-1 to 1-6.

The carboxylic acid group content of all lignosulfonates used for the adhesives according to the present invention was measured using $^{31}P$ NMR and was found to be in the range of 0.05 to 0.6 mmol/g, based on the dry weight of the lignosulfonate lignins, for all examples.

Example 2

To 30.0 g lignosulfonate solution (50% solids), 0.4 g NH4OH (24.7%) was added and mixed followed by addition of 1.9 g Primid XL552 (100% solids) and mixing. Finally, 0.7 g Silane (Momentive VS-142 40% activity, 10% in water) and 64.3 g water were added and mixed to yield 15% solids and then used for test of mechanical properties in bar tests.

Example 11

To 30.0 g lignosulfonate solution (50% solids), 0.4 g NH4OH (24.7%) was added and mixed followed by addition of 2.1 g Primid XL552 (100% solids) and 3.4 g PEG 200 (100% solids) and mixing. Finally, 0.7 g Silane (Momentive VS-142 40% activity, 10% in water) and 61.8 g water were added and mixed to yield 15% solids and then used for test of mechanical properties in bar tests.

Example 15

To 30.0 g lignosulfonate solution (50% solids), 0.4 g NH4OH (24.7%) was added and mixed followed by addition of 2.9 g Primid XL552 (100% solids) and 3.4 g PEG 200 (100% solids) and mixing. Finally, 0.8 g Silane (Momentive VS-142 40% activity, 10% in water) and 67 g water were added and mixed to yield 15% solids and then used for test of mechanical properties in bar tests.

Example 30

To 30.0 g lignosulfonate solution (50% solids), 0.4 g $NH_4OH$ (24.7%) was added and mixed followed by addition of 2.9 g Primid XL552 (100% solids) and 3.4 g 1,1,1 tris(hydroxymethyl)propane (100% solids) and mixing. Finally, 0.8 g Silane (Momentive VS-142 40% activity, 10% in water) and 67 g water were added and mixed to yield 15% solids and then used for test of mechanical properties in bar tests.

Example 33

To 100.0 g lignosulfonate solution (50% solids), 0.3 g KOH in pellet form was added and mixed followed by addition of 10.8 g Primid XL552 (100% solids) and 11.3 g PEG 200 (100% solids) and mixing. Finally, 2.6 g Silane (Momentive VS-142 40% activity, 10% in water) and 228 g water were added and mixed to yield 15% solids and then used for test of mechanical properties in bar tests.

Example 41

To 30.0 g lignosulfonate solution (50% solids), 0.4 g NH4OH (24.7%) was added and mixed followed by addition of 1.9 g Primid XL552 (100% solids) and 1.7 g PEG 200 (100% solids) and 1.7 g urea (100% solids) and mixing.

Finally, 0.7 g Silane (Momentive VS-142 40% activity, 10% in water) and 60.5 g water were added and mixed to yield 15% solids and then used for test of mechanical properties in bar tests.

Mechanical properties are presented in Tables 1.1-1.6. For simplicity, quantities of all other components are recalculated based on 100 g of dry lignin.

As can be seen from Table 1.1 a combination of cross-linker (Primid XL 552) and plasticizer (PEG 200) is required to achieve high mechanical properties (unaged and aged strength in bar test) that are at comparable level to reference adhesive (11 and 15 versus 2 and 9 versus reference adhesive).

Table 1.2 and 1.3 show that different plasticizers can be used (13 and 15 versus 30) or combination of plasticizers (34 versus 41) and that the PEG 200 is a preferred plasticizer.

Table 1.4 shows that addition of silane can help achieve aged strength on the same level as reference adhesives.

Table 1.5 shows that the adhesive has high strength without the presence of a base but that a non-permanent base ($NH_4OH$) or a permanent base (KOH) can be added to the formulation to protect the production equipment from corrosion without significant changes in strength.

Table 1.6 shows that different lignosulfonates can be used.

This overall means, we are able to produce a mineral wool product based on a phenol and formaldehyde-free adhesive composition with a high content of renewable material based on lignin, which has comparable mechanical properties to the reference systems and can be produced in a simpler and less expensive way.

TABLE 1.1

| | Reference adhesive (Phenol-formaldehyde resin modified with urea, a PUF-resol) | Reference adhesive (adhesive based on alkali oxidized lignin) | 1 | 2 | 8 | 9 | 10 | 11 | 15 |
|---|---|---|---|---|---|---|---|---|---|
| Adhesive composition | | | | | | | | | |
| ammonium lignosulfonate (g dry lignin) | | | 100 | 100 | 100 | 100 | 100 | 100 | 100 |
| ammonium calcium lignosulfonate (g dry lignin) | | | | | | | | | |
| PEG 200 (g) | | | 0 | 0 | 23 | 40 | 23 | 23 | 23 |
| 1,1,1 tris(hydroxymethyl)propane (g) | | | | | | | | | |
| urea (g) | | | | | | | | | |
| NH4OH (g) | | | 0.8 | 0.8 | 0.8 | 0.8 | 0.8 | 0.8 | 0.8 |
| KOH (g) | | | | | | | | | |
| Primid XL552 (g) | | | 0 | 14 | 0 | 0 | 7 | 14 | 20 |
| Momentive VS 142 (% of adhesive solids), based on 40% activity | | | 0.5 | 0.5 | 0.5 | 0.5 | 0.5 | 0.5 | 0.5 |
| Properties | | | | | | | | | |
| Mechanical strength, unaged (N), bars tests | 350 | 270 | 60 | 280 | 70 | 150 | 110 | 230 | 320 |
| Mechanical strength, aged (N), bar tests | 150 | 130 | 0 | 50 | 20 | 40 | 50 | 140 | 130 |
| Curing temp, ° C. | 200 | 225 | 225 | 225 | 225 | 225 | 225 | 225 | 225 |

TABLE 1.2

| | 12 | 13 | 15 | 26 | 27 | 28 | 29 | 30 |
|---|---|---|---|---|---|---|---|---|
| Adhesive composition | | | | | | | | |
| ammonium lignosulfonate (g dry lignin) | 100 | 100 | 100 | 100 | 100 | 100 | 100 | 100 |
| ammonium calcium lignosulfonate (g dry lignin) | | | | | | | | |
| PEG 200 (g) | 23 | 23 | 23 | | | | | |
| 1,1,1 tris(hydroxymethyl)propane (g) | | | | 23 | 23 | 40 | 23 | 23 |
| urea (g) | | | | | | | | |
| Primid XL552 (g) | 13 | 13 | 20 | 0 | 0 | 0 | 20 | 20 |
| NH4OH (g) | 0.8 | 0.8 | 0.8 | 0.8 | 0.8 | 0.8 | 0.8 | 0.8 |
| KOH (g) | | | | | | | | |
| Momentive VS 142 (% of adhesive solids), based on 40% activity | | | | | | | | |
| Momentive VS 142 (% of adhesive solids), based on 40% activity | 0 | 0.5 | 0.5 | 0 | 0.5 | 0.5 | 0 | 0.5 |
| Adhesive properties | | | | | | | | |
| Mechanical strength, unaged (N), bars tests | 250 | 250 | 320 | 80 | 90 | 90 | 200 | 210 |
| Mechanical strength, aged (N), bar tests | 30 | 110 | 130 | 10 | 10 | 20 | 60 | 100 |
| Curing temp, ° C. | 225 | 225 | 225 | 225 | 225 | 225 | 225 | 225 |

TABLE 1.3

| | 34 | 36 | 39 | 40 | 41 |
|---|---|---|---|---|---|
| Adhesive composition | | | | | |
| ammonium lignosulfonate (g dry lignin) | 100 | 100 | 100 | 100 | 100 |
| ammonium calcium lignosulfonate (g dry lignin) | | | | | |
| PEG 200 (g) | 23 | 12 | 4.5 | 0 | 12 |
| 1,1,1 tris(hydroxymethyl)propane (g) | | | | | |
| urea (g) | | | | | 12 |
| Primid XL552 (g) | 13 | 13 | 13 | 13 | 13 |
| NH4OH (g) | 0.8 | 0.8 | 0.8 | 0.8 | 0.8 |
| KOH (g) | | | | | |
| Momentive VS 142 (% of adhesive solids), based on 40% activity | 0.5 | 0.5 | 0.5 | 0.5 | 0.5 |
| Adhesive properties | | | | | |
| Mechanical strength, unaged (N), bars tests | 150 | 150 | 140 | 60 | 135 |
| Mechanical strength, aged (N), bar tests | 60 | 50 | 40 | 20 | 40 |
| Curing temp, ° C. | 225 | 225 | 225 | 225 | 225 |

TABLE 1.4

| | 12 | 13 | 14 | 15 | 29 | 30 |
|---|---|---|---|---|---|---|
| Adhesive composition | | | | | | |
| ammonium lignosulfonate (g dry lignin) | 100 | 100 | 100 | 100 | 100 | 100 |
| ammonium calcium lignosulfonate (g dry lignin) | | | | | | |
| PEG 200 (g) | 23 | 23 | 23 | 23 | | |
| 1,1,1 tris(hydroxymethyl)propane (g) | | | | | 23 | 23 |
| urea (g) | | | | | | |
| Primid XL552 (g) | 13 | 13 | 20 | 20 | 20 | 20 |
| NH4OH (g) | 0.8 | 0.8 | 0.8 | 0.8 | 0.8 | 0.8 |
| KOH (g) | | | | | | |
| Momentive VS 142 (% of adhesive solids), based on 40% activity | 0 | 0.5 | 0 | 0.5 | 0 | 0.5 |
| Adhesive properties | | | | | | |
| Mechanical strength, unaged (N), bars tests | 250 | 250 | 380 | 320 | 200 | 210 |
| Mechanical strength, aged (N), bar tests | 30 | 110 | 40 | 130 | 60 | 100 |
| Curing temp, ° C. | 225 | 225 | 225 | 225 | 225 | 225 |

TABLE 1.5

| | 31 | 32 | 33 |
|---|---|---|---|
| Adhesive composition | | | |
| ammonium lignosulfonate (g dry lignin) | 100 | 100 | 100 |
| ammonium calcium lignosulfonate (g dry lignin) | | | |
| PEG 200 (g) | 23 | 23 | 23 |
| 1,1,1 tris(hydroxymethyl)propane (g) | | | |
| urea (g) | | | |
| Primid XL552 (g) | 22 | 22 | 22 |
| NH4OH (g) | 0 | 1.0 | 0 |
| KOH (g) | 0 | 0 | 0.6 |
| Momentive VS 142 (% of adhesive solids), based on 40% activity | 0.5 | 0.5 | 0.5 |
| Adhesive properties | | | |
| Mechanical strength, unaged (N), bars tests | 330 | 300 | 290 |
| Mechanical strength, aged (N), bar tests | 160 | 120 | 130 |
| Curing temp, ° C. | 225 | 225 | 225 |

TABLE 1.6

| | 11 | 15 | 45 | 46 |
|---|---|---|---|---|
| Adhesive composition | | | | |
| ammonium lignosulfonate (g dry lignin) | 100 | 100 | | |
| ammonium calcium lignosulfonate (g dry lignin) | | | 100 | 100 |
| PEG 200 (g) | 23 | 23 | 23 | 23 |
| 1,1,1 tris(hydroxymethyl)propane (g) | | | | |
| urea (g) | | | | |
| Primid XL552 (g) | 13 | 20 | 13 | 20 |
| NH4OH (g) | 0.8 | 0.8 | 0.8 | 0.8 |
| KOH (g) | | | | |
| Momentive VS 142 (% of adhesive solids), based on 40% activity | 0.5 | 0.5 | 0.5 | 0.5 |
| Adhesive properties | | | | |
| Mechanical strength, unaged (N), bar tests | 230 | 320 | 210 | 300 |

TABLE 1.6-continued

| | 11 | 15 | 45 | 46 |
|---|---|---|---|---|
| Mechanical strength, aged (N), bar tests | 140 | 130 | 120 | 130 |
| Curing temp, ° C. | 225 | 225 | 225 | 225 |

Examples 47-54

In the following, the entry numbers of the adhesive example correspond to the entry numbers used in Table 2.

The carboxylic acid group content of all lignosulfonates used for the adhesives according to the present invention was measured using 31P NMR and was found to be in the range of 0.05 to 0.6 mmol/g, based on the dry weight of the lignosulfonate lignins, while it was found for this specific batch used for examples 47, 48, 49, 50, 51, 52, 53, 54 to be 0.14 mmol/g.

Example 47

To 30.0 g lignosulfonate solution (50% solids), 0.4 g NH4OH (24.7%) was added and mixed followed by addition of 0.7 g Silane (Momentive VS-142 40% activity, 10% in water) and 68.9 g water were added and mixed to yield 15% solids and then used for test of mechanical properties in bar tests.

Example 49

To 30.0 g lignosulfonate solution (50% solids), 0.4 g NH4OH (24.7%) was added and mixed followed by addition of 6.0 g Primid XL552 (100% solids) and mixing. Finally, 1.0 g Silane (Momentive VS-142 40% activity, 10% in water) and 102.6 g water were added and mixed to yield 15% solids and then used for test of mechanical properties in bar tests.

Mechanical properties are presented in Table 2. For simplicity, quantities of all other components are recalculated based on 100 g of dry lignin.

As can be seen from Table 2, in a combination of lignosulfonate and crosslinker (Primid XL 552) higher amounts of crosslinker lead to better mechanical properties.

TABLE 2

| | PUF ref | 47 | 48 | 49 | 50 |
|---|---|---|---|---|---|
| Adhesive composition | | | | | |
| ammonium lignosulfonate (g solids) | | 100 | 100 | 100 | 100 |
| PEG 200 (g) | | 0 | 0 | 0 | 0 |
| urea (g) | | | | | |
| ammonia, 24.7% (g) | | 2.5 | 2.5 | 2.5 | 2.5 |
| Primid XL552 (g) | | 0 | 25 | 40 | 60 |
| Momentive VS 142 (% of adhesive solids), based on 40% activity | | 0.5 | 0.5 | 0.5 | 0.5 |
| Properties | | | | | |
| Mechanical strength, unaged (N), bars tests | 350 | 60 | 280 | 460 | 640 |
| Mechanical strength, aged (N), bar tests | 150 | 0 | 160 | 180 | 230 |
| Curing temp, ° C. | 200 | 225 | 225 | 225 | 225 |

Examples 51-53: Test of Stone Wool Products

The low density products have been examined for properties according to the product standard for Factory made mineral wool (MW) products, DS/EN13162: 2012+A1: 2015, meaning relevant mechanical properties besides other basic characteristics for stone wool products.

The testing has been performed on slabs, where test specimens according to the dimensional specifications and to the number of test specimens required to get one test result, as stated in EN13162 for each of the different test methods, has been cut out. Each of the stated values for the mechanical properties obtained is an average of more results according to EN13162.

Tests are performed on products or test specimens sampled directly from the production line before packing (line cuts) and/or for products or test specimens sampled from packs 24 hours after packing (24 h packs).

Dimensions

Dimensions of products and test specimens has been performed according to the relevant test methods, DS/EN822: 2013: Thermal insulating products for building applications-Determination of length and width, and DS/EN823: 2013: Thermal insulating products for building applications-Determination of thickness.

Binder Content (Loss on Ignition)

Determination of binder content is performed according to DS/EN13820: 2003: Thermal insulating materials for building applications-Determination of organic content, where the binder content is defined as the quantity of organic material burnt away at a given temperature, stated in the standard to be (500±20° C.). In the testing the temperature (590±20° C., for at least 10 min or more until constant mass) has been used in order to make sure that all organic material is burnt away. Determination of ignition loss consists of at least 10 g wool corresponding to 8-20 cut-outs (minimum 8 cut-outs) performed evenly distributed over the test specimen using a cork borer ensuring to comprise an entire product thickness. The binder content is taken as the LOI. The binder includes oil and other binder additives.

Tensile Strength

The tensile strength of low density products has been determined according to EN 1608:2013: Thermal insulating products for building applications-Determination of tensile strength parallel to faces. The tensile strength is measured on test specimens from line cuts and on test specimens from 24 h packs.

Self Deflection (f70)

Self-deflection is measured according to an internal test method for determining the deflection caused by the net weight of a product. A test-specimen of length: 990±10 mm and width: min. 270±5 mm and max 680±5 mm is placed horizontally on two supports (tilting table) with a mutual centre distance of (700±2) mm and two moveable supporting devices. The self-deflection is measured in the middle of the specimen and recorded either mechanically or electrically (transducer with display) and read either on a scale or a digital display. If the original product is longer than 990±10 mm the extra length is cut off. The self-deflection is measured on both surfaces of the test specimen. The accuracy of measurement is ±0.2 mm for self-deflection <10 mm and ±1 mm for self-deflection >10 mm).

The self-deflection is reported as (f70, 70 cm span)=(f1+f2)/2 mm, where f1 is the measurement with surface 1 facing up and f2 is the measurement with surface 2 facing up.

Testing is performed on test specimens from line cuts and on test specimens from 24 h packs.

Example 51

The stone wool product has been produced by use of binder in example 51, at a curing oven temperature set to 275° C.

730.0 kg of ammonium lignosulfonate was placed in a mixing vessel to which 8.5 l NH4OH (24.7%) was added and stirred. Afterwards, 151 kg Primid XL552 solution (pre-made 31 wt % solution in water) and 43 kg PEG 200 (100% solids) were added and mixed followed by addition of 13 kg Silane (Momentive VS-142 40% activity, 10% in water) and 100 kg silicone (Wacker BS 1052, 12% in water).

The binder from this example is used to produce a low density stone wool product, thickness and density were measured as indicated in Table 3. Curing oven temperature was set to 275° C.

Example 52

The stone wool product has been produced by use of binder in example 52, at a curing oven temperature set to 275° C.

730.0 kg of ammonium lignosulfonate was placed in a mixing vessel to which 8.5 l NH4OH (24.7%) was added and stirred. Afterwards, 151 kg Primid XL552 solution (pre-made 31 wt % solution in water) and 43 kg PEG 200 (100% solids) were added and mixed followed by addition of 13 kg Silane (Momentive VS-142 40% activity, 10% in water) and 100 kg silicone (Wacker BS 1052, 12% in water).

The binder from this example is used to produce a low density stone wool product, thickness and density were measured as indicated in Table 3. Curing oven temperature was set to 275° C.

Example 53

The stone wool product has been produced by use of binder in example 53, at a curing oven temperature set to 275° C.

609.0 kg of ammonium lignosulfonate was placed in a mixing vessel to which 8 l NH4OH (24.7%) was added and stirred. Afterwards, 384 kg Primid XL552 solution (pre-made 31 wt % solution in water) was added and mixed followed by addition of 14 kg Silane (Momentive VS-142 40% activity, 10% in water).

The binder from this example is used to produce a low density stone wool product, thickness and density were measured as indicated in Table 3. Curing oven temperature was set to 275° C.

TABLE 3

| | Tensile strength, crosswise - packs | | Self | | | Tensile strength, crosswise - line cuts | | | |
|---|---|---|---|---|---|---|---|---|---|
| Example | Thickness mm | Ignition loss % | deflection f(70) mm | Sample density kg/m3 | Sigma (t) kPa | Ignition loss % | Thickness mm | Sample density kg/m3 | Sigma (t) kPa |
| PUF-reference | 145 | 2.82 | 7.2 | 32.3 | 7.6 | 2.50 | 153 | 31.0 | 10.2 |
| 51 | 137 | 3.10 | 15.8 | 34.3 | 5.9 | 2.61 | 157 | 29.4 | 10.2 |
| 52 | 137 | 3.92 | 9.6 | 32.9 | 5.6 | 3.57 | 157 | 32.2 | 9.3 |
| 53 | 139 | 2.81 | 8.9 | 34.3 | 6.7 | 2.54 | 158 | 30.7 | 8.7 |

Example 54

The stone wool product has been produced by use of binder in example 54, at a curing oven temperature set to 275° C.

730.0 kg of ammonium lignosulfonate was placed in a mixing vessel to which 8.5 I NH4OH (24.7%) was added and stirred. Afterwards, 151 kg Primid XL552 solution (pre-made 31 wt % solution in water) and 43 kg PEG 200 (100% solids) were added and mixed followed by addition of 13 kg Silane (Momentive VS-142 40% activity, 10% in water) and 40 kg silicone (Wacker BS 1052, 12% in water).

The binder from this example is used to produce a high density stone wool product, 100 mm thickness, 145 kg/m$^3$ density. Curing oven temperature was set to 275° C.

BRIEF DESCRIPTION OF THE FIGURES

FIG. 2 shows an insulation product 1 formed by an MMVF batt 2. On its underside the batt is provided with a first facing 3. The first facing 3 can have moisture-proof properties. The facing 3 is connected by means of an adhesive layer 4 to the MMVF batt 2. In this particular embodiment, although not essential in the invention, on its top side the MMVF batt 2 is provided with a layer 5 of adhesive. This adhesive layer 5 is used to fix the insulation product onto the objects to be insulated. So as to facilitate storage and transport, a removable second facing 6 provided with a layer of heat-stable silicone material is arranged on adhesive layer 5. It is noted here that the adhesive layer extends a short distance from the edge of the insulation product in order to facilitate detaching of the cover sheet.

Figure 1:
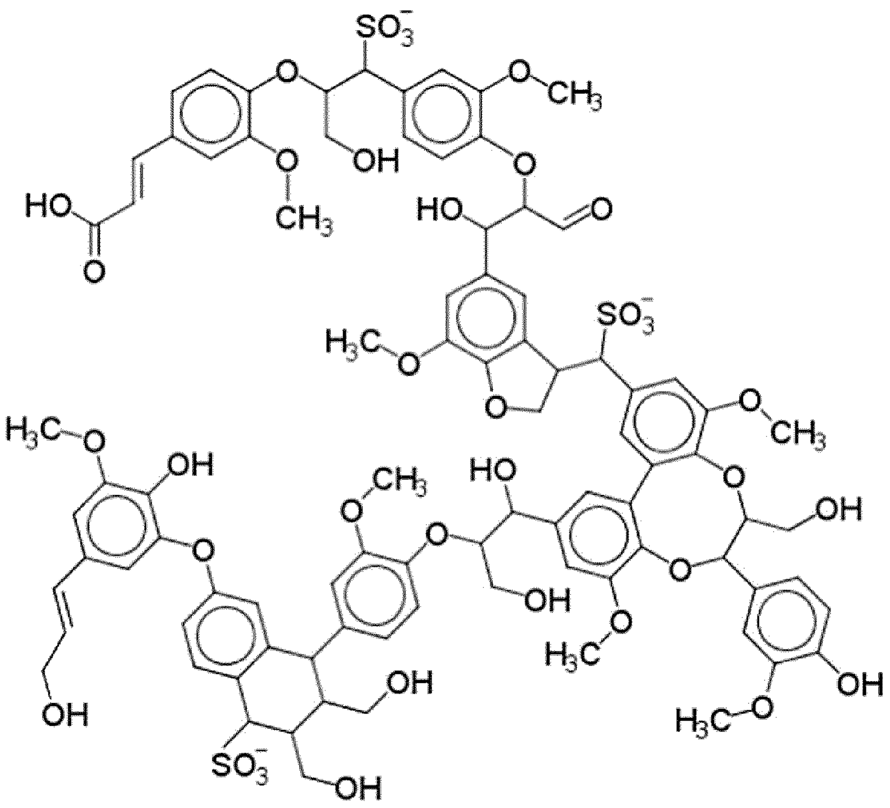
FIG. 1 shows a commonly used model structure of lignosulfonates.
Figure 2:
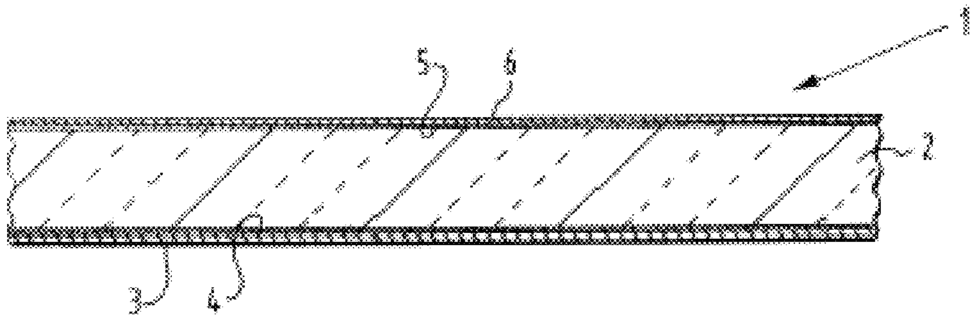
FIG. 2 is a cross-sectional view of an insulation product according to the invention.
Figure 3:
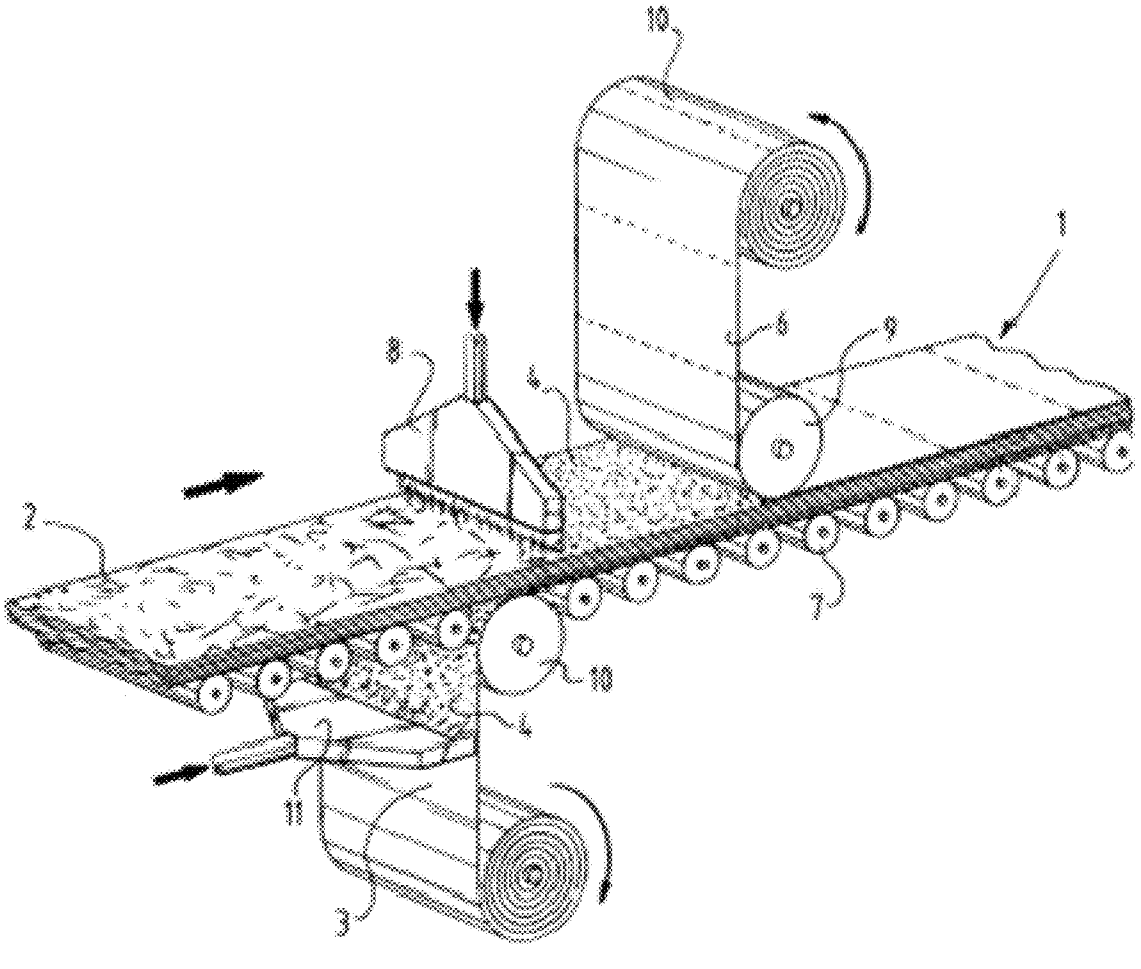
FIG. 3 is a diagrammatic illustration of a method of the invention prior to the curing oven stage.

Production of such an insulation product can proceed as follows, as shown in FIG. 3.

An MMVF batt 2 is made by air-laying a MMVF web with binder and consolidating it (not shown). Starting from this MMVF batt 2 supplied via a conveyor belt formed by rollers 7, a quantity of adhesive is initially supplied by means of an atomizing device 11 provided with nozzles and sprayed in the form of an aqueous composition as defined in the invention onto a first facing 3, provided from a roller, which in this case is flexible and can for instance take the form of a layer of woven or non-woven glass veil, fabric, foil, plastic or a combination thereof. The first facing 3 is arranged on the underside of the MMVF batt 2 by means of a roller 10.

A second facing layer 6 in the form of heat-stable silicone PE foil is subsequently arranged on the upper side of the MMVF batt 2 by means of a roller 9. As described for the facing layer 3, and again starting from the MMVF batt 2 supplied via conveyor belt of rollers 7, adhesive 4 of the adhesive layer 5 used to fix the insulation product onto the objects to be insulated is applied by means of spray device 8 onto a major surface of batt 2.

The adhesive for the first facing 3 and the binder for the MMVF matrix are subsequently cured in conventional manner by passing the MMVF batt through a curing oven (not shown).

EXAMPLES

Example 1—Peel Strength

A fleece (Johns Manville Glass fiber nonwoven Evalith DH 50/20) was cut into 3 cm wide strands. An adhesive was applied onto the fleece by a roller at 40 g/m2 loading level. The fleece with the adhesive was pressed onto a finished MMVF product that has 145 kg/m$^3$ density with 2500 Pa of pressure and cured at 200 to 225° C. for 45 minutes. The binder in the MMVF product was made as follows:

730.0 kg of ammonium lignosulfonate was placed in a mixing vessel to which 8.5 I NH4OH (24.7%) was added and stirred. Afterwards, 151 kg Primid XL552 solution (pre-made 31 wt % solution in water) and 43 kg PEG 200 (100% solids) were added and mixed followed by addition of 13 kg Silane (Momentive VS-142 40% activity, 10% in water) and 40 kg silicone (Wacker BS 1052, 12% in water). Curing oven temperature was set to 275° C.

After curing of the adhesive, the product was left to cool down at room temperature for 2 hours and the adhesion strength was measured. The measurement was done by pulling the end edge of the fleece in a tensile direction perpendicular to the surface of the MMVF product with Mecmesin force gauge and adhesion strength is expressed in grams.

This method was carried out for four different adhesives to bind the fleece to the MMVF product.

Adhesive 1, according to the invention, was made as follows:

To 200.0 g lignosulfonate solution (50% solids), 2.5 g NH4OH (24.7%) was added and mixed followed by addition by addition of 20.0 g Primid XL552 (100% solids), and 23.0 g PEG 200 (100% solids) and mixing. Finally, 120.3 g water was added and mixed to yield 35% solids and then used for testing the adhesion.

Comparative Adhesive 1 is made as follows (PUF adhesive):

A phenol-formaldehyde resin is prepared by reacting 37% aq. formaldehyde (606 g) and phenol (189 g) in the presence of 46% aq. potassium hydroxide (25.5 g) at a reaction temperature of 84° C. preceded by a heating rate of approximately 1° C. per minute. The reaction is continued at 84° C. until the acid tolerance of the resin is 4 and most of the phenol is converted. Urea (241 g) is then added and the mixture is cooled.

The acid tolerance (AT) expresses the number of times a given volume of a adhesive can be diluted with acid without the mixture becoming cloudy (the adhesive precipitates). Sulfuric acid is used to determine the stop criterion in a adhesive production and an acid tolerance lower than 4 indicates the end of the adhesive reaction.

To measure the AT, a titrant is produced from diluting 2.5 ml conc. sulfuric acid (>99%) with 1 L ion exchanged water. 5 mL of the adhesive to be investigated is then titrated at room temperature with this titrant while keeping the adhesive in motion by manually shaking it; if preferred, use a magnetic stirrer and a magnetic stick. Titration is continued until a slight cloud appears in the adhesive, which does not disappear when the adhesive is shaken.

The acid tolerance (AT) is calculated by dividing the amount of acid used for the titration (mL) with the amount of sample (mL):

$$AT=(\text{Used titration volume (mL)})/(\text{Sample volume (mL)})$$

Using the urea-modified phenol-formaldehyde resin obtained, an adhesive is made by addition of 25% aq. ammonia (90 mL) and ammonium sulfate (13.2 g) followed by water (1.30 kg).

The adhesive solids were then measured as described above and the mixture was diluted with the required amount of water and silane (15% adhesive solids solution, 0.5% silane of adhesive solids).

Comparative adhesive 2 is made as follows (lignin based adhesive):

3267 kg of water is charged in 6000 l reactor followed by 287 kg of ammonia water (24.7%). Then 1531 kg of Lignin UPM BioPiva 100 is slowly added over a period of 30 min to 45 min. The mixture is heated to 40° C. and kept at that temperature for 1 hour. After 1 hour a check is made on insolubilized lignin. This can be made by checking the solution on a glass plate or a Hegman gauge. Insolubilized lignin is seen as small particles in the brown adhesive. During the dissolution step will the lignin solution change color from brown to shiny black. After the lignin is completely dissolved, 1 liter of a foam dampening agent (Skumdæmper 11-10 from NCÅ-Verodan) is added. Temperature of the batch is maintained at 40° C. Then addition of 307.5 kg 35% hydrogen peroxide is started. The hydrogen peroxide is dosed at a rate of 200-300 l/h. First half of the hydrogen peroxide is added at a rate of 200 l/h where after the dosage rate is increased to 300 l/h.

During the addition of hydrogen peroxide is the temperature in the reaction mixture controlled by heating or cooling in such a way that a final reaction temperature of 65° C. is reached.

The final product was analysed for the COOH group content, dry solid matter, pH, viscosity and remaining $H_2O_2$·60 g of this oxidized lignin (18.2% solids) was mixed with 1.4 g Primid XL552 (100% solids) and 2.8 g PEG200 (100% solids). 0.6 g Silane (Momentive VS-142 40% activity, 10% in water) and 17.4 g water were added and mixed to yield 15% solids.

Comparative adhesive 3 is made as follows (formaldehyde free, sugar-based adhesive).

A mixture of 75.1% aq. glucose syrup (19.98 g; thus efficiently 15.0 g glucose syrup), 50% aq. hypophosphorous acid (0.60 g; thus efficiently 0.30 g, 4.55 mmol hypophosphorous acid) and sulfamic acid (0.45 g, 4.63 mmol) in water (30.0 g) was stirred at room temperature until a clear solution was obtained.

28% aq. ammonia (0.80 g; thus efficiently 0.22 g, 13.15 mmol ammonia) was then added dropwise until pH=7.9. The adhesive solids was then measured (21.2%).

The binder mixture was diluted with water (0.403 g/g binder mixture) and 10% aq. silane (0.011 g/g binder mixture, Momentive VS-142). The final binder mixture for mechanical strength studies had pH=7.9.

The results are shown in Table 1. As can be seen from Table 1, when the adhesive of the invention is used to glue the fleece to the MMVF product, the peel strength is less than PUF but is acceptable and is improved in comparison to comparative formaldehyde free binders.

TABLE 1

| adhesive | adhesive 1 | Comparative adhesive 3 (formaldehyde free) | Comparative adhesive 2 (lignin) | Comparative adhesive 1 PUF |
|---|---|---|---|---|
| strength, g | 237 | 132 | 233 | 290 |

Example 2—Peel Strength

Aluminium foil with a thickness of 40 μm was cut into 3 cm wide strands. Binder was applied onto the aluminium foil strand by a roller at 30 g/m2 loading level. The aluminium foil with the binder was pressed onto a finished mineral wool product similar to the one in Example 1 with 4000 Pa of pressure and cured at 200-225C for 90 minutes. After curing, the material was left to cool down at room temperature for 2 hours and the adhesion strength was measured. Measurement was done by pulling the end edge of the aluminium foil strand in a tensile direction perpendicular to the surface of the MMVF product with Mecmesin force gauge and adhesion strength is expressed in grams.

The same adhesives were used as in Example 1. The results are shown in Table 2. As can be seen from Table 2, when the adhesive of the invention is used to glue the aluminium foil to the MMVF product, the peel strength is less than PUF but is acceptable and is improved in comparison to comparative formaldehyde free binders.

TABLE 1

| adhesive | adhesive 1 | Comparative adhesive 3 (formaldehyde free) | Comparative adhesive 2 (lignin) | Comparative adhesive 1 PUF |
|---|---|---|---|---|
| strength, g | 292 | 210 | 282 | 307 |

The invention claimed is:

1. A method of making an insulation product, the method comprising:
providing a batt of man-made vitreous fibres (MMVF) in a matrix comprising a binder, wherein the batt of man-made vitreous fibres comprises at least one major surface;
providing a facing;
fixing the facing to at least one major surface of the batt of man-made vitreous fibres by the use of an adhesive; and
curing the adhesive, wherein the adhesive is an aqueous adhesive composition which is free of phenol and formaldehyde and comprises:
a component (i) in form of one or more lignosulfonate lignins having a carboxylic acid group content of 0.03 to 2.0 mmol/g, based on the dry weight of the lignosulfonate lignins,
a component (ii) in form of one or more cross-linkers,
wherein component (i) has an average carboxylic acid group content of less than 1.8 groups per macromolecule considering the M_n wt. average of component (i).

2. The method according to claim 1, wherein the facing is selected from woven or non-woven glass fibre veils or fabrics, scrims, rovings, glass fibre silks, glass filament fabrics, spunbonded polyester webs, vapour membranes, vapour barriers, roof underlay foils, aluminium foil and housewraps.

3. The method according to claim 1, wherein the facing is a non-woven glass veil having an area weight in the range of 30 to 150 g/m$^2$.

4. The method according to claim 1, wherein the facing is a mineral coated non-woven glass veil having an area weight in the range of 150 to 350 g/m$^2$.

5. The method according to claim 1, wherein the facing is a glass fibre silk or glass filament fabric having an area weight in the range of 90 to 180 g/m$^2$.

6. The method according to claim 1, wherein the facing has at least one major surface and the method comprises applying adhesive to a major surface of the facing and/or the batt, and then applying said major surface of the facing to a major surface of the batt of man-made vitreous fibres.

7. The method according to claim 1, comprising applying the adhesive by spraying.

8. The method according to claim 1, wherein the step of curing the adhesive is carried out at a temperature of from 100 to 300° C.

9. The method according to claim 1, wherein the step of fixing the facing to at least one major surface of the batt is carried out when the binder for the MMVF is uncured, and the step of curing the adhesive also cures the binder in the matrix of MMVF.

10. The method according to claim 1, wherein the step of fixing the facing to at least one major surface of the batt is carried out after curing the binder for the MMVF.

11. The method according to claim 1, wherein the batt has a density in the range of 20 to 200 kg/m$^3$.

12. The method according to claim 1, wherein the loss on ignition (LOI) of the batt of man-made vitreous fibres bonded by the binder is within the range of 0.5 to 8 wt %.

13. The method according to claim 1, wherein the insulation product has a thickness in the range of 20 to 400 mm.

14. The method according to claim 1, wherein the adhesive is applied in an amount of 40 to 400 g/m$^2$ of a liquid adhesive.

15. The method according to claim 1, wherein the method further comprises applying a coating to the facing after fixing the facing to the batt.

16. The method according to claim 1, wherein the insulation product is selected from the group consisting of an external façade, a ventilated façade, an interior ceiling insulation product, an interior wall insulation product, a roof insulation product, a ventilation duct or channel acoustic absorption product.

17. The method according to claim 1, wherein the binder in the batt of man-made vitreous fibres (MMVF) is a binder composition which prior to curing is an aqueous composition which is free of phenol and formaldehyde and comprises:
a component (i) in form of one or more lignosulfonate lignins having a carboxylic acid group content of 0.03 to 2.0 mmol/g, based on the dry weight of the lignosulfonate lignins,
a component (ii) in form of one or more cross-linkers.

18. An insulation product obtained by the method according to claim 1.

19. A method of making an insulation product, the method comprising:
providing a batt of man-made vitreous fibres (MMVF) in a matrix comprising uncured binder, wherein the batt of man-made vitreous fibres comprises at least one major surface;
providing a facing;
applying the facing to at least one major surface of the batt of man-made vitreous fibres; and curing the binder so as to fix the facing to the major surface, wherein the binder is an aqueous binder composition which is free of phenol and formaldehyde and comprises:
a component (i) in form of one or more lignosulfonate lignins having a carboxylic acid group content of 0.03 to 2.0 mmol/g, based on the dry weight of the lignosulfonate lignins,
a component (ii) in form of one or more cross-linkers,
wherein component (i) has an average carboxylic acid group content of less than 1.8 groups per macromolecule considering the M_n wt. average of component (i).

20. A method according to claim 19, wherein the facing is selected from woven or non-woven glass fibre veils or fabrics, scrims, rovings, glass fibre silks, glass filament fabrics, spunbonded polyester webs, vapour membranes, vapour barriers, roof underlay foils, aluminium foil and housewraps.

21. The method according to claim 19, wherein the step of curing the binder is carried out at a temperature of from 100 to 300° C.

22. An insulation product comprising an insulation element which is a batt of man-made vitreous fibres (MMVF) bonded with a binder, wherein the batt of man-made vitreous fibres comprises at least one major surface, and comprising a facing, wherein the facing is fixed to at least one major surface of the insulation element by an adhesive, wherein the adhesive before curing is an aqueous adhesive composition which is free of phenol and formaldehyde and comprises:

a component (i) in form of one or more lignosulfonate lignins having a carboxylic acid group content of 0.03 to 2.0 mmol/g, based on the dry weight of the lignosulfonate lignins, a component (ii) in form of one or more cross-linkers, wherein component (i) has an average carboxylic acid group content of less than 1.8 groups per macromolecule considering the M_n wt. average of component (i).

23. A product according to claim 22, the aqueous adhesive/binder composition further comprising a component (iii) in form of one or more plasticizers.

24. A product according to claim 23, wherein component (iii) is in form of one or more plasticizers selected from the group consisting of fatty alcohols and monohydroxy alcohols; and/or one or more plasticizers selected from the group consisting of alkoxylates; and/or one or more plasticizers in form of propylene glycols; and/or one or more plasticizers in form of glycol esters; and/or one or more plasticizers selected from the group consisting of adipates, acetates, benzoates, cyclobenzoates, citrates, stearates, sorbates, sebacates, azelates, butyrates, valerates; and/or one or more plasticizers selected from the group consisting of phenol derivatives; and/or one or more plasticizers selected from the group consisting of silanols, siloxanes; and/or one or more plasticizers selected from the group consisting of sulfates, sulfonates, and phosphates; and/or one or more plasticizers in form of hydroxy acids; and/or one or more plasticizers selected from the group consisting of monomeric amides and fatty acid amides; and/or one or more plasticizers selected from the group consisting of quaternary ammonium compounds; and/or one or more plasticizers selected from the group consisting of vegetable oils; and/or tall oil, and/or one or more plasticizers selected from the group consisting of hydrogenated oils, acetylated oils; and/or one or more plasticizers selected from acid methyl esters; and/or one or more plasticizers selected from the group consisting of alkyl polyglucosides, gluconamides, aminoglucoseamides, sucrose esters, sorbitan esters; and/or one or more plasticizers selected from the group consisting of polyethylene glycols, polyethylene glycol ethers; and/or one or more plasticizers in form of polyols; and/or triethanolamine.

25. A product according to claim 23, wherein component (iii) is in form of propylene glycols, phenol derivatives, silanols, siloxanes, hydroxy acids, vegetable oils, polyethylene glycols, polyethylene glycol ethers, triethanolamine, or any mixtures thereof.

26. A product according to claim 23, wherein component (iii) comprises one or more plasticizers having a boiling point of 100 to 380° C..

27. A product according to claim 23, wherein component (iii) comprises one or more polyethylene glycols having an average molecular weight of 150 to 50000 g/mol.

28. A product according to claim 23, wherein component (iii) is present in the binder composition in an amount of 0.5 to 60, based on the dry weight of component (i).

29. A product according to claim 22, the adhesive/binder composition comprising a further component (iv) in form of one or more coupling agents.

30. A product according to claim 22, wherein component (i) is having a carboxylic acid group content of 0.05 to 0.6 mmol/g, based on the dry weight of lignosulfonate lignins.

31. A product according to claim 22, wherein component (i) is in form of one or more lignosulfonate lignins having an average carboxylic acid group content of less than 1.4 groups per macromolecule considering the M_n wt. average of component (i).

32. A product according to claim 22, wherein component (i) is having a content of phenolic OH groups of 0.3 to 2.5 mmol/g, based on the dry weight of lignosulfonate lignins.

33. A product according to claim 22, wherein component (i) is having a content of aliphatic OH groups of 1.0 to 8.0 mmol/g, based on the dry weight of lignosulfonate lignins.

34. A product according to claim 22, wherein the component (i) comprises ammoniumlignosulfonates and/or comprises calciumlignosulfonates, and/or magnesiumlignosulfonates, and any combinations thereof.

35. A product according to claim 22, wherein component (i) comprises ammoniumlignosulfonates and calciumlignosulfonates, wherein the molar ratio of $NH_4^+$ to $Ca^{2+}$ is in the range of 5:1 to 1:5.

36. A product according to claim 22, wherein the aqueous adhesive/binder composition contains added sugar in an amount of 0 to less than 5 wt.-%, based on the weight of lignosulfonate and sugar.

37. A product according to claim 22, wherein the aqueous adhesive/binder composition comprises component (i) in an amount of 50 to 98 wt.-%, based on the dry weight of components (i) and (ii).

38. A product according to claim 22, wherein the component (ii) is in form of one or more cross-linkers selected from a. β-hydroxyalkylamide-cross-linkers, and/or b. oxazoline-cross-linkers, and/or c. the group consisting of multifunctional organic amines, and/or d. epoxy compounds having a molecular weight of more than 500, which contains reactive functional groups, and/or e. one or more cross-linkers selected from the group consisting of fatty amines; and/or f. one more cross-linkers in form of fatty amides; and/or g. one or more cross-linkers selected from polyester polyols; and/or h. one or more cross-linkers selected from the group consisting of starch, modified starch, CMC; and/or i. One or more cross-linkers in form of multifunctional carbodiimides; and/or j. one or more cross-linkers selected from melamine based cross-linkers.

39. A product according to claim 22, wherein the component (ii) comprises one or more cross-linkers selected from β-hydroxyalkylamide-cross-linkers and/or oxazoline-cross-linkers.

40. A product according to claim 22, the adhesive/binder composition comprising component (ii) in an amount of 1 to 50 wt.-%, based on the dry weight of component (i).

41. A product according to claim 22, wherein the component (ii) is in form of one or more cross-linkers selected from a. β-hydroxyalkylamide-cross-linkers, and/or
b. the group consisting of multifunctional organic amines, and/or
c. epoxy compounds having a molecular weight of more than 500, which contains reactive functional groups, and/or
d. one or more cross-linkers in form of multifunctional carbodiimides.

42. A product according to claim 22, wherein the component (ii) comprises one or more cross-linkers selected from
a. β-hydroxyalkylamide-cross-linkers.

43. A product according to claim 22, the adhesive/binder composition comprising component (ii) in an amount of 2 to 90 wt.-%, based on the dry weight of component (i).

44. A product according to claim 22, the adhesive/binder composition further comprising a component (v) in form of one or more components selected from the group of bases.

45. A product according to claim 22, the adhesive/binder composition comprising a further component in form of urea in an amount 5 to 40 wt.-%, based on the dry weight of component (i).

46. A product according to claim 22, wherein the batt further comprises a further component (vi) in the form of one or more reactive or nonreactive silicones.

47. A product according to claim 22, wherein the batt does not contain an ammonia-oxidized lignin (AOL).

48. A product according to claim 22 with the proviso that the aqueous composition does not comprise a cross-linker selected from carbonyl compounds selected from aldehydes, carbonyl compounds of the formula $R—[C(O)R_1]_x$
in which:
a. R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups,
b. $R_1$ represents a hydrogen atom or a $C_1$-$C_{10}$ alkyl radical, and
c. x varies from 1 to 10.

49. A product according to claim 22 with the proviso that the aqueous composition does not comprise a cross-linker selected from polyamines.

50. A product according to claim 22 with the proviso that the aqueous composition does not comprise a cross-linker selected from:
a. epoxy compounds having a molecular weight Mw of 500 or less.

* * * * *